US012621858B2

(12) United States Patent
Xu et al.

(10) Patent No.: US 12,621,858 B2
(45) Date of Patent: May 5, 2026

(54) CONFIGURATION FOR USER EQUIPMENT (UE)-INITIATED CHANNEL OCCUPANCY TIME (COT) IN FRAME-BASED EQUIPMENT (FBE) MODE

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 18/040,013

(22) PCT Filed: Sep. 11, 2020

(86) PCT No.: PCT/CN2020/114773
§ 371 (c)(1),
(2) Date: Jan. 31, 2023

(87) PCT Pub. No.: WO2022/052036
PCT Pub. Date: Mar. 17, 2022

(65) Prior Publication Data
US 2023/0284261 A1     Sep. 7, 2023

(51) Int. Cl.
*H04W 74/00*        (2009.01)
*H04W 74/04*        (2009.01)
(52) U.S. Cl.
CPC ......... *H04W 74/006* (2013.01); *H04W 74/04* (2013.01)

(58) Field of Classification Search
CPC ............................ H04W 74/006; H04W 74/04
See application file for complete search history.

(56) References Cited

U.S. PATENT DOCUMENTS

2019/0335456 A1    10/2019   Yerramalli et al.
2019/0335500 A1*   10/2019   Zhang ................... H04W 74/08
(Continued)

FOREIGN PATENT DOCUMENTS

CN         111601392 A      8/2020
WO       2020023475 A1     1/2020
(Continued)

OTHER PUBLICATIONS

Apple Inc: "URLLC Uplink Enhancements for Unlicensed Spectrum", 3GPP TSG RAN WG1 #102-e, e-Meeting, R1-2006516, Aug. 17-28, 2020, (Aug. 28, 2020), 5 Pages, Aug. 8, 2020 (Aug. 8, 2021) section 2-4, the whole document.
(Continued)

*Primary Examiner* — Melanie Jagannathan
(74) *Attorney, Agent, or Firm* — QUALCOMM Incorporated

(57) ABSTRACT

Wireless communication systems and methods related to configuration for user equipment (UE)-initiated channel occupancy time (COT) in a frame-based equipment (FBE) mode are provided. A user equipment (UE) receives, from a base station (BS), a configuration for the UE to initiate a COT in an FBE mode. The configuration indicates a first FBE frame period. The UE initiates the COT in a first FBE frame having the first FBE frame period. The UE transmits, to the BS during the COT, an uplink communication signal.

35 Claims, 10 Drawing Sheets

(56) References Cited

U.S. PATENT DOCUMENTS

| | | | |
|---|---|---|---|
| 2019/0342045 A1* | 11/2019 | Radulescu | H04L 27/0006 |
| 2020/0037354 A1* | 1/2020 | Li | H04W 74/0808 |
| 2020/0314891 A1* | 10/2020 | Li | H04W 74/006 |
| 2021/0298072 A1* | 9/2021 | Oh | H04W 72/0446 |
| 2021/0360421 A1* | 11/2021 | Wang | H04W 74/006 |
| 2021/0385863 A1* | 12/2021 | Fan | H04W 74/0841 |
| 2022/0159723 A1* | 5/2022 | Jiang | H04W 72/0446 |
| 2022/0167413 A1* | 5/2022 | Myung | H04W 74/004 |
| 2022/0322401 A1* | 10/2022 | He | H04W 16/14 |
| 2022/0322425 A1* | 10/2022 | He | H04W 74/0808 |
| 2022/0377790 A1* | 11/2022 | Awadin | H04W 74/006 |
| 2023/0035989 A1* | 2/2023 | Awadin | H04W 72/569 |
| 2023/0064829 A1* | 3/2023 | Yang | H04W 72/23 |
| 2023/0072340 A1* | 3/2023 | El Hamss | H04W 74/0808 |
| 2023/0107215 A1* | 4/2023 | Kumagai | H04W 74/0875 370/329 |
| 2023/0131003 A1* | 4/2023 | Noh | H04W 74/0808 370/329 |
| 2023/0156786 A1* | 5/2023 | Myung | H04W 74/0808 370/329 |
| 2023/0180292 A1* | 6/2023 | Pan | H04W 74/006 370/329 |
| 2023/0180293 A1* | 6/2023 | Calcev | H04W 16/14 370/328 |
| 2023/0189334 A1* | 6/2023 | He | H04W 72/56 370/329 |
| 2023/0309142 A1* | 9/2023 | Tooher | H04W 74/0808 |
| 2023/0319885 A1* | 10/2023 | Bagheri | H04L 1/189 370/329 |
| 2023/0354275 A1* | 11/2023 | Moon | H04W 74/0808 |
| 2024/0098781 A1* | 3/2024 | Tsai | H04W 74/0808 |

FOREIGN PATENT DOCUMENTS

| | | |
|---|---|---|
| WO | 2020027533 A1 | 2/2020 |
| WO | 2020029950 A1 | 2/2020 |

OTHER PUBLICATIONS

International Search Report and Written Opinion—PCT/CN2020/114773—ISA/EPO—May 27, 2021.
LG Electronics: "Discussion on Unlicensed Band URLLC/IIOT", 3GPP TSG RAN WG1 #102-e, R1-2006316, e-Meeting, Aug. 17-28, 2020, 5 Pages, Jul. 8, 2020, Section 2.
Qualcomm Incorporated: "Uplink Enhancements for URLLC in Unlicensed Controlled Environments", 3GPP Draft, R1-2006801, 3GPP TSG-RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051918251, 7 Pages, paragraph [0002], Section 2, Figure 2-3-1, the whole document.
Moderator (Ericsson): "Summary#5 on Enhancements for Unlicensed Band URLLC/IIoT for R17", 3GPP TSG RAN WG1 Meeting #102-e, R1-2007391, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 28, 2020, XP051922866, 66 pages, p. 40, first table, p. 61, lines 1-51 p. 62, lines 1-25 p. 63, lines 1-25.
Supplementary European Search Report—EP20952824—Search Authority—The Hague—Apr. 5, 2024.

* cited by examiner

500

600

1000

Receive, from a base station (BS), a configuration for the UE to initiate a channel occupancy time (COT) in a frame-based equipment (FBE) mode, the configuration indicating a first FBE frame period    1010

Initiate the COT in a first FBE frame having the first FBE frame period    1020

Transmit, to the BS during the COT, an uplink communication signal.    1030

Figure 11:
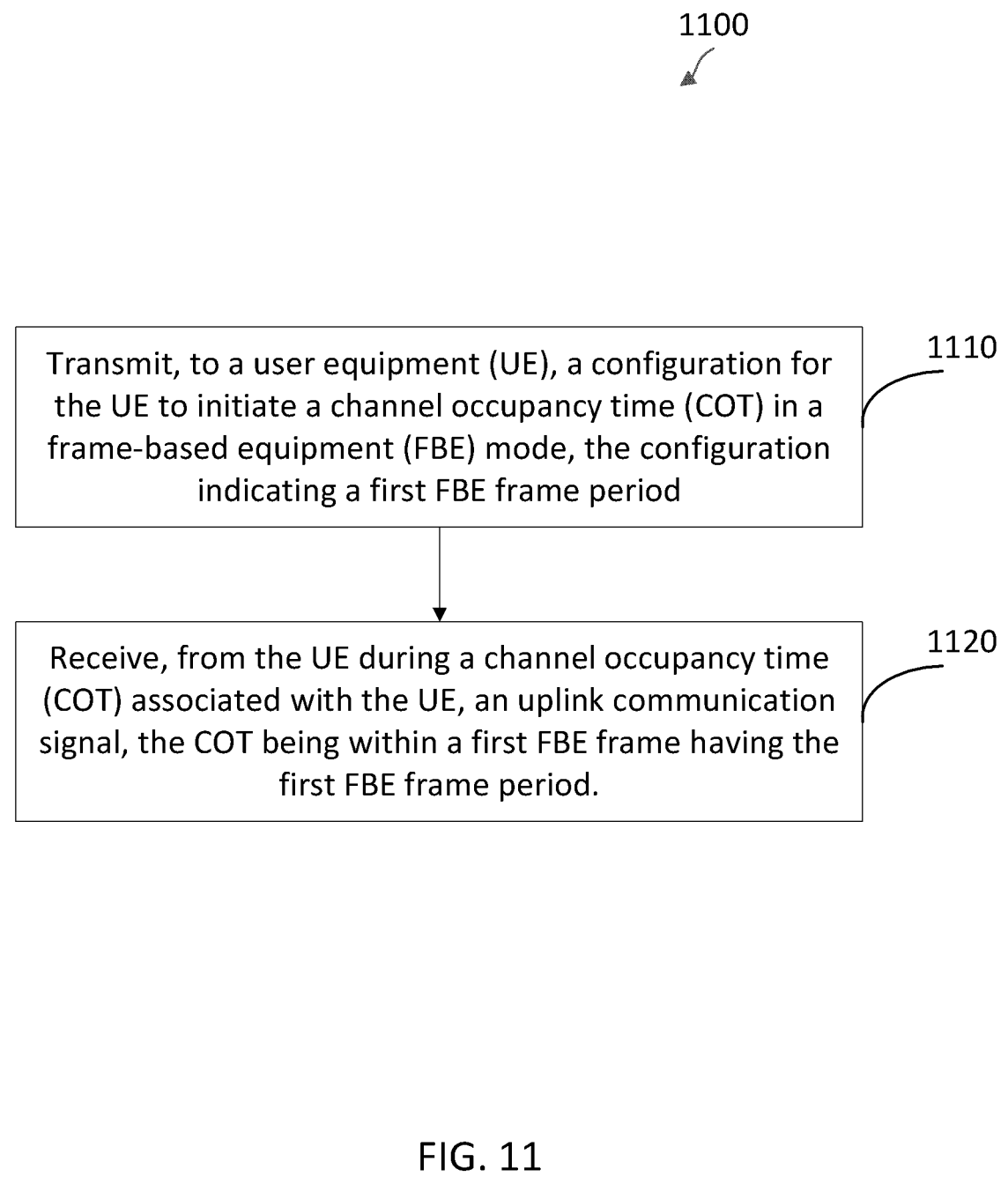

1100

Transmit, to a user equipment (UE), a configuration for the UE to initiate a channel occupancy time (COT) in a frame-based equipment (FBE) mode, the configuration indicating a first FBE frame period

1110

Receive, from the UE during a channel occupancy time (COT) associated with the UE, an uplink communication signal, the COT being within a first FBE frame having the first FBE frame period.

CONFIGURATION FOR USER EQUIPMENT (UE)-INITIATED CHANNEL OCCUPANCY TIME (COT) IN FRAME-BASED EQUIPMENT (FBE) MODE

CROSS-REFERENCE TO RELATED APPLICATIONS

The present application is a 35 U.S.C. 371 National Phase entry of Patent Cooperation Treaty (PCT) Application No. PCT/CN2020/114773, filed Sep. 11, 2020, which is hereby expressly incorporated herein by reference in its entirety.

TECHNICAL FIELD

This application relates to wireless communication systems and methods, and more particularly to configuration for user equipment (UE)-initiated channel occupancy time (COT) in a frame-based equipment (FBE) mode for communications over a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an UL transmission in an unlicensed frequency band. The UE may perform an LBT procedure prior to the scheduled time. When the LBT is a success, the UE may proceed to transmit UL data according to the schedule. When the LBT fails, the UE may refrain from transmitting.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE), the method includes receiving, from a base station (BS), a configuration for the UE to initiate a channel occupancy time (COT) in a frame-based equipment (FBE) mode, the configuration indicating a first FBE frame period; initiating the COT in a first FBE frame having the first FBE frame period; and transmitting, to the BS during the COT, an uplink communication signal.

In an additional aspect of the disclosure, a method of wireless communication performed by a base station (BS), the method includes transmitting, to a user equipment (UE), a configuration for the UE to initiate a channel occupancy time (COT) in a frame-based equipment (FBE) mode, the configuration indicating a first FBE frame period; and receiving, from the UE during a channel occupancy time (COT) associated with the UE, an uplink communication signal, the COT being within a first FBE frame having the first FBE frame period.

In an additional aspect of the disclosure, a user equipment (UE) includes a transceiver configured to receive, from a base station (BS), a configuration for the UE to initiate a channel occupancy time (COT) in a frame-based equipment (FBE) mode, the configuration indicating a first FBE frame period; and transmit, to the BS during the COT, an uplink communication signal; and a processor configured to initiate the COT in a first FBE frame having the first FBE frame period.

In an additional aspect of the disclosure, a base station (BS) includes a transceiver configured to transmit, to a user equipment (UE), a configuration for the UE to initiate a channel occupancy time (COT) in a frame-based equipment (FBE) mode, the configuration indicating a first FBE frame period; and receive, from the UE during a channel occupancy time (COT) associated with the UE, an uplink communication signal, the COT being within a first FBE frame having the first FBE frame period.

In an additional aspect of the disclosure, a non-transitory computer-readable medium having program code recorded thereon, the program code includes code for causing a user equipment (UE) to receive, from a base station (BS), a configuration for the UE to initiate a channel occupancy time (COT) in a frame-based equipment (FBE) mode, the configuration indicating a first FBE frame period; code for causing the UE to initiate the COT in a first FBE frame having the first FBE frame period; and code for causing the UE to transmit, to the BS during the COT, an uplink communication signal.

In an additional aspect of the disclosure, a non-transitory computer-readable medium having program code recorded thereon, the program code includes code for causing a base station (BS) to transmit, to a user equipment (UE), a configuration for the UE to initiate a channel occupancy time (COT) in a frame-based equipment (FBE) mode, the configuration indicating a first FBE frame period; and code for causing the BS to receive, from the UE during a channel occupancy time (COT) associated with the UE, an uplink communication signal, the COT being within a first FBE frame having the first FBE frame period.

In an additional aspect of the disclosure, a user equipment (UE) includes means for receiving, from a base station (BS), a configuration for the UE to initiate a channel occupancy time (COT) in a frame-based equipment (FBE) mode, the configuration indicating a first FBE frame period; means for initiating the COT in a first FBE frame having the first FBE frame period; and means for transmitting, to the BS during the COT, an uplink communication signal.

In an additional aspect of the disclosure, a base station (BS) includes means for transmitting, to a user equipment (UE), a configuration for the UE to initiate a channel occupancy time (COT) in a frame-based equipment (FBE) mode, the configuration indicating a first FBE frame period; and means for receiving, from the UE during a channel occupancy time (COT) associated with the UE, an uplink communication signal, the COT being within a first FBE frame having the first FBE frame period.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIG. 11 is a flow diagram of a communication method according to some aspects of the present disclosure.

DETAILED DESCRIPTION

Figure 1:
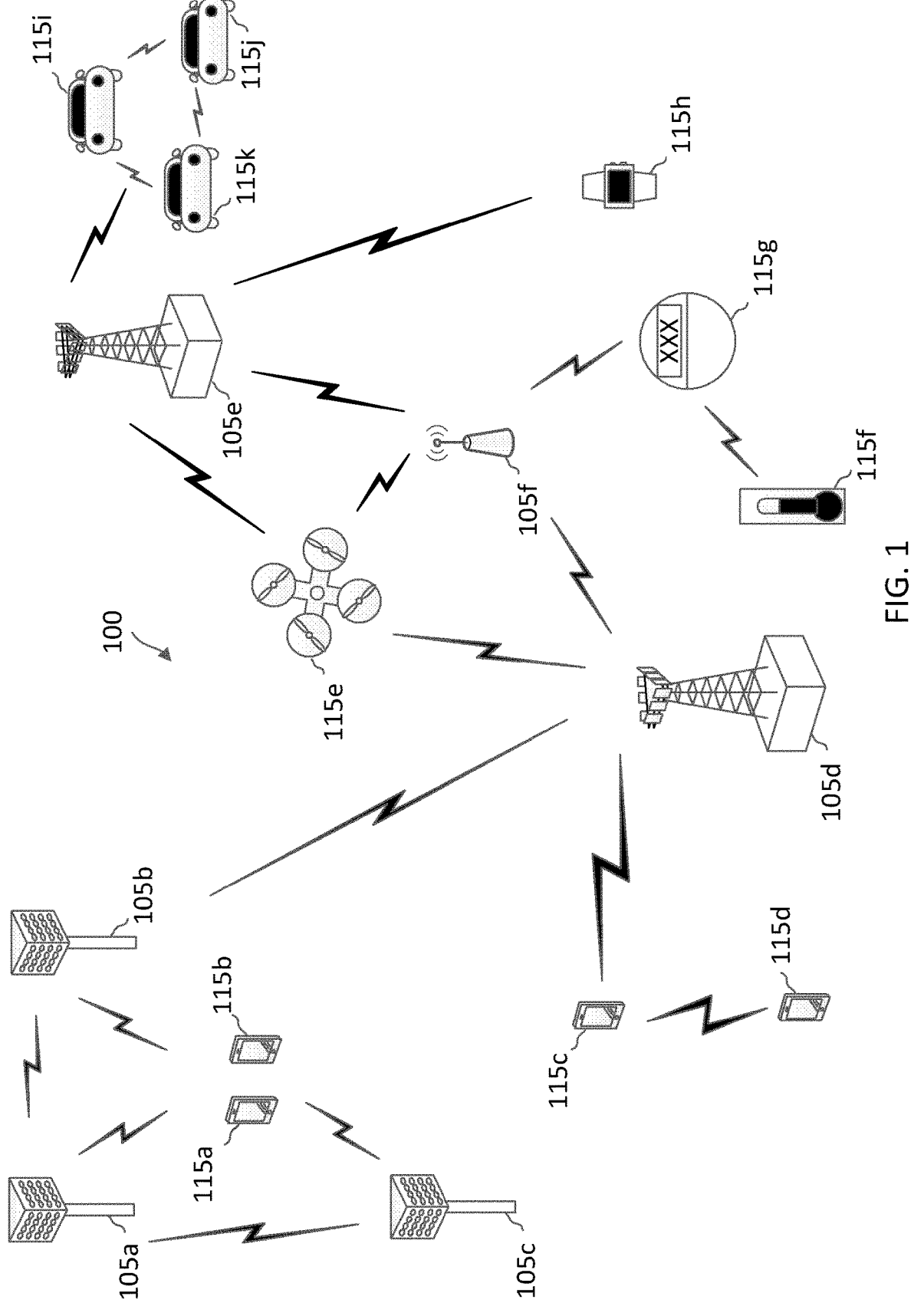
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Some studies have been conducted for NR-U deployment over a 5 gigahertz (GHz) band to support enhanced mobile broadband (eMBB). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. The addition of these bands also presents opportunities for internet of things (IOT) scenarios, such as industrial IOT (IIOT) scenarios in which a large number of UEs are present. In some instances, it may be desirable to enable URLLC between IIOT UEs in shared and/or unlicensed frequencies.

There are two approaches, load-based equipment (LBE) and frame-based equipment (FBE), to channel access over an unlicensed band or a shared frequency band. LBE utilizes a dynamic channel access configuration. For instance, a node (e.g., a BS or a UE) operating in an LBE mode may perform LBT at any time instant. If the channel is busy, the node may perform a random back-off and may perform LBT again after the random back-off. In contrast, FBE utilizes a semi-static channel access configuration. For instance, a node (e.g., a BS or a UE) operating in an FBE mode may perform LBT at fixed time instants. If the channel is busy, the node may back off for a fixed time period and may perform LBT again after the fixed time period. In other words, an FBE frame structure may include periodic fixed frame periods (FFPs), which may also be referred to as FBE frames. Each FFP includes an idle period at an end of the FFP. A node may perform an LBT during an idle period to contend for a COT in a following FFP.

In some aspects, a network may provision for URLLC over a shared frequency band or an unlicensed band using an FBE mode for channel access. For instance, FBE mode may be suitable when the network operates in an isolated environment or controlled environment (e.g., with no nearby WiFi node). When operating in an FBE mode, a channel occupancy time (COT) is typically initiated or acquired by a BS. For instance, the BS may initiate or acquire a COT in an FFP by performing an LBT during an idle period of a preceding BS FFP. After acquiring a COT, the BS may schedule a UE for UL and/or DL transmission during the COT. In some instances, the UE may transmit an UL communication signal to the BS in an FFP upon detecting a DL transmission (e.g., physical downlink control channel (PDCCH), synchronization signal block (SSB), physical broadcast channel (PBCH), remaining minimum system information (RMSI), group common (GC)-PDCCH signals, and/or the like) from the BS in the FFP (indicating the BS had acquired the COT in the FFP). To facilitate communications between the BS and the UE in the FBE mode, the BS may broadcast information related to the FBE frame or FFP structure (e.g., the duration of an FFP, the duration of an idle period, and/or an alignment of the FFP relative to a radio frame) used by the BS. In some situations, it may be desirable for a UE to initiate or acquire a COT and communicate with the BS, for example, to reduce transmission latency for URLLC traffic, instead of relying on COTs initiated by the BS.

The present disclosure describes mechanisms for configuring FBE frame structure to provision for UE-initiated COTs. For example, a BS may perform channel access according to an FFP structure including a plurality of FFPs (e.g., periodic FFPs), which may be referred to as BS FFPs. Each BS FFP may include a COT followed by an idle period. To enable COT initiation at a UE, the BS may configure the UE with a similar FFP structure, which may be referred to as a UE FFP structure. For instance, the UE FFP structure may include a plurality of periodic UE FFPs each having a first frame period (e.g., a duration). In some instances, the first frame period of the UE FFP may have a different duration than a second frame period of the BS FFP. In some other instances, the first frame period of the UE FFP may have the same duration as the second frame period of the BS FFP. Additionally, the start of a UE FFP can be offset from the start of a BS FFP. In some aspects, the BS may transmit a configuration indicating the first frame period and/or the offset to the UE. In some aspects, the configuration may be a radio resource control (RRC) configuration. Accordingly, the UE may receive the configuration and may initiate a COT according to the configuration. For instance, the UE may initiate a COT in a UE FFP by performing an LBT during an idle period of a preceding UE FFP. Upon gaining access or winning the COT (passing the LBT), the UE may transmit an UL transmission to the BS during the UE-initiated COT.

In some aspects, the BS may configure the UE FFP structure separately or independently from the BS FFP structure. For instance, the BS may select the first frame period for the UE FFP from a first set of frame periods, and may select a second frame period for the BS FFP from a second set of frame periods. In some aspects, the first set of frame periods and the second set of frame periods may include at least one different frame period. In some aspects, the first set of FBE frame periods may be the same as the second set of FBE frame periods. In some aspects, the BS may configure the first FBE frame period of the UE FFP based on the second frame period of the BS FFP. For instance, the first FBE frame period may be an integer multiple of the second FBE frame periods. Alternatively, the first FBE frame period may be an integer factor of the second FBE frame periods.

In some aspects, the BS may further determine a periodicity at which the UE may initiate a COT. For instance, traffic (UL transmission) at the UE may have a periodic pattern and the traffic periodicity may be longer than the frame period of a UE FFP. As such, the BS may configure a UE-initiated COT recurring period (e.g., a periodicity) that is longer than the frame period of the UE FFP. In some aspects, the UE-initiated COT recurring period may include multiple UE FFPs (e.g., about 2, 3, 4 or more). The UE-initiated COT recurring period determines how often the UE may initiate a COT, and the duration of a COT within a UE FFP determines the duration of a UE COT. In some aspects, the BS may indicate to the UE (e.g., in the configuration) that the UE may initiate a COT in an FFP with a starting boundary aligned to a boundary of the UE-initiated COT recurring period. In some aspects, the BS may indicate to the UE (e.g., in the configuration) that the UE may initiate a COT within an FFP offset from a boundary of the UE-initiated COT recurring period. For instance, the BS may include, in the configuration, an indication of a first number of UE FFPs in the UE-initiated COT recurring period and a second number of UE FFPs in the offset.

Aspects of the present disclosure can provide several benefits. For example, configuring a UE FFP structure and signaling the UE FFP structure can allow an FBE-based UE to contend for and acquire COTs, thereby allowing for more efficient UL transmissions. Additionally, configuring a UE FFP structure separately from a BS FFP structure can allow for flexibility, for example, to consider UE traffic pattern in the UE FFP structure and/or optimize channel access and/or resource utilization between the BS and the UE. Further, configuring a UE-initiated COT recurring period separately from frame period or duration of UE FFP can decouple the UE traffic periodicity from the UE FFP structure.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, the network 100 may operate over an unlicensed band, for example, a 6 GHz bands. As discussed above, FCC may regulate maximum EIRP and/or maximum EIRP PSD for transmission in a 6 GHz band. Thus, when the network operates over a 6 GHz channel, a BS 105 may communicate with a UE 115 in accordance with the FCC regulation. In some aspects, the network 100 may operate in an FBE mode. FBE-based channel access is a semi-static channel access configuration, where LBTs are performed at fixed time instants. For instance, an FBE frame structure may include periodic FFPs each including a COT period followed by an idle period. The FFPs may also be referred to as FBE frames. To acquire a COT in a certain FFP, a node (e.g., a BS 105) may perform an LBT during an idle period of a preceding FFP. To facilitate FBE mode of operations, the BS 105 may broadcast system information indicating an FBE configuration and a PRACH configuration to facilitate UEs 115 in accessing the network 100 over the unlicensed band. The FBE configuration may include information associated with durations for FFPs, durations and/or locations of idle periods in the FFPs. The PRACH configuration may indicate PRACH resources or ROs where a UE 115 may use to transmit a PRACH preamble to initiate a network access.

When operating in the FBE mode, the BS 105 may contend or initiate a COT in the channel by performing an LBT in an idle period of a preceding FFP. After acquiring a COT, the BS 105 may schedule the UE 115 for UL and/or DL transmission during the COT. In some instances, the UE 115 may transmit an UL communication signal to the BS 105 in an FFP upon detecting a DL transmission (e.g., a PDCCH signal, an SSB, a PBCH signal, RMSI, GC-PDCCH signal, and/or the like) from the BS 105 in the FFP (indicating the BS 105 had acquired the COT in the FFP).

According to aspects of the present disclosure, the network 100 may also provision for COT initiation at the UEs 115, for example, to provide a lower transmission latency for UL transmissions, such as URLLC transmissions. To facilitate UE-initiated COT acquisition, the BS 105 may configure an FFP structure including periodic FFPs for a UE 115 to initiate a COT in the FBE mode. The UE FFP structure may be substantially similar to the BS FFP structure. For instance, each UE FFP may include a COT followed by an idle period. However, the UE FFPs may be time offset from the FFPs of the BS. For instance, a starting boundary of a UE FFP may be offset from a starting boundary of a BS FFP. The BS 105 may transmit a configuration indicating the UE FFP structure to the UE 115. Accordingly, the UE 115 may receive the configuration and acquire a COT according to the configuration. For instance, similar to the BS 105, the UE 115 may acquire a COT in a UE FFP by performing an LBT during an idle period of a preceding UE FFP. Mechanisms for configuring a UE FFP structure for a UE 115 to initiate a COT in an FBE mode are described in greater detail herein.

Figure 2:
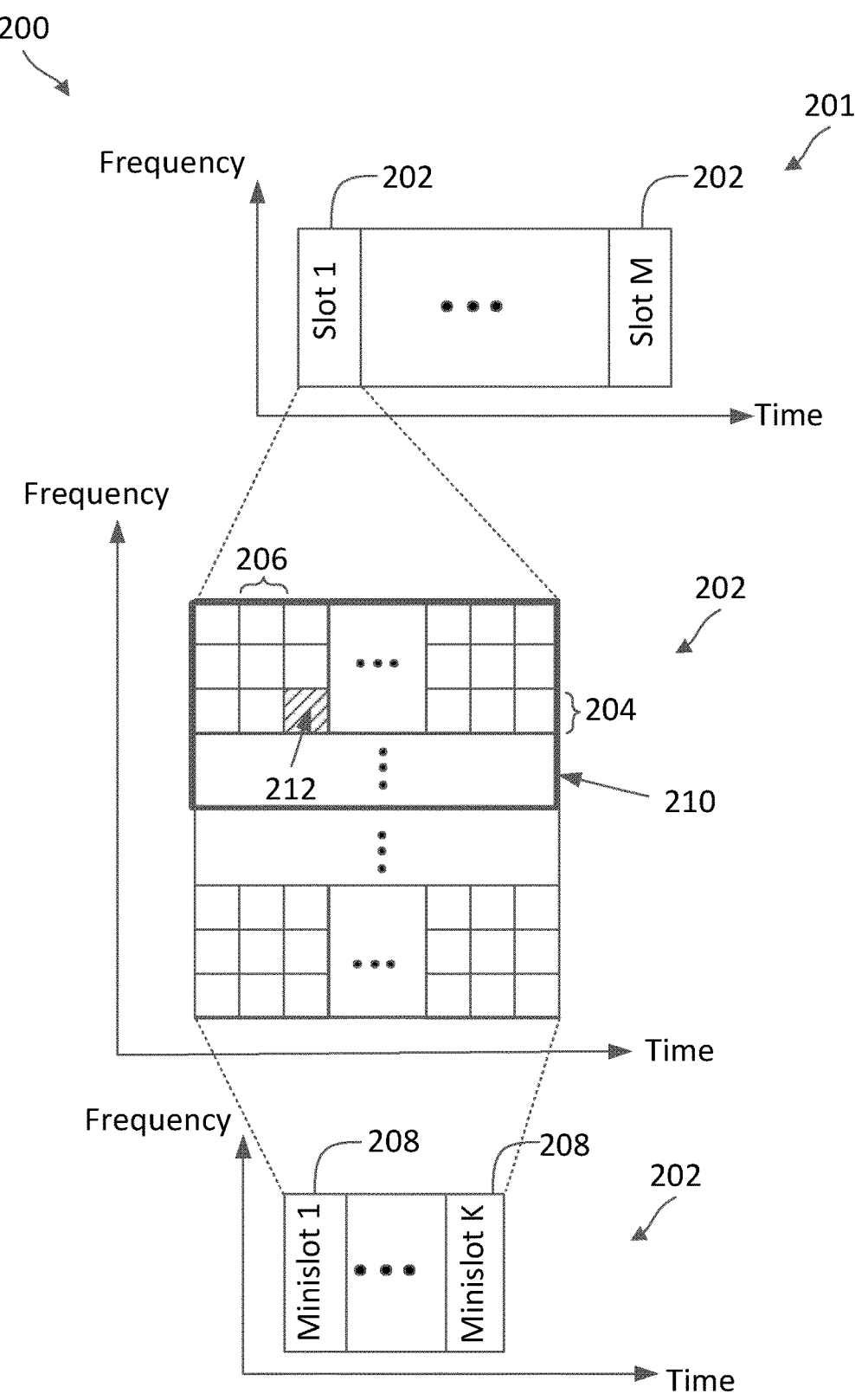
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
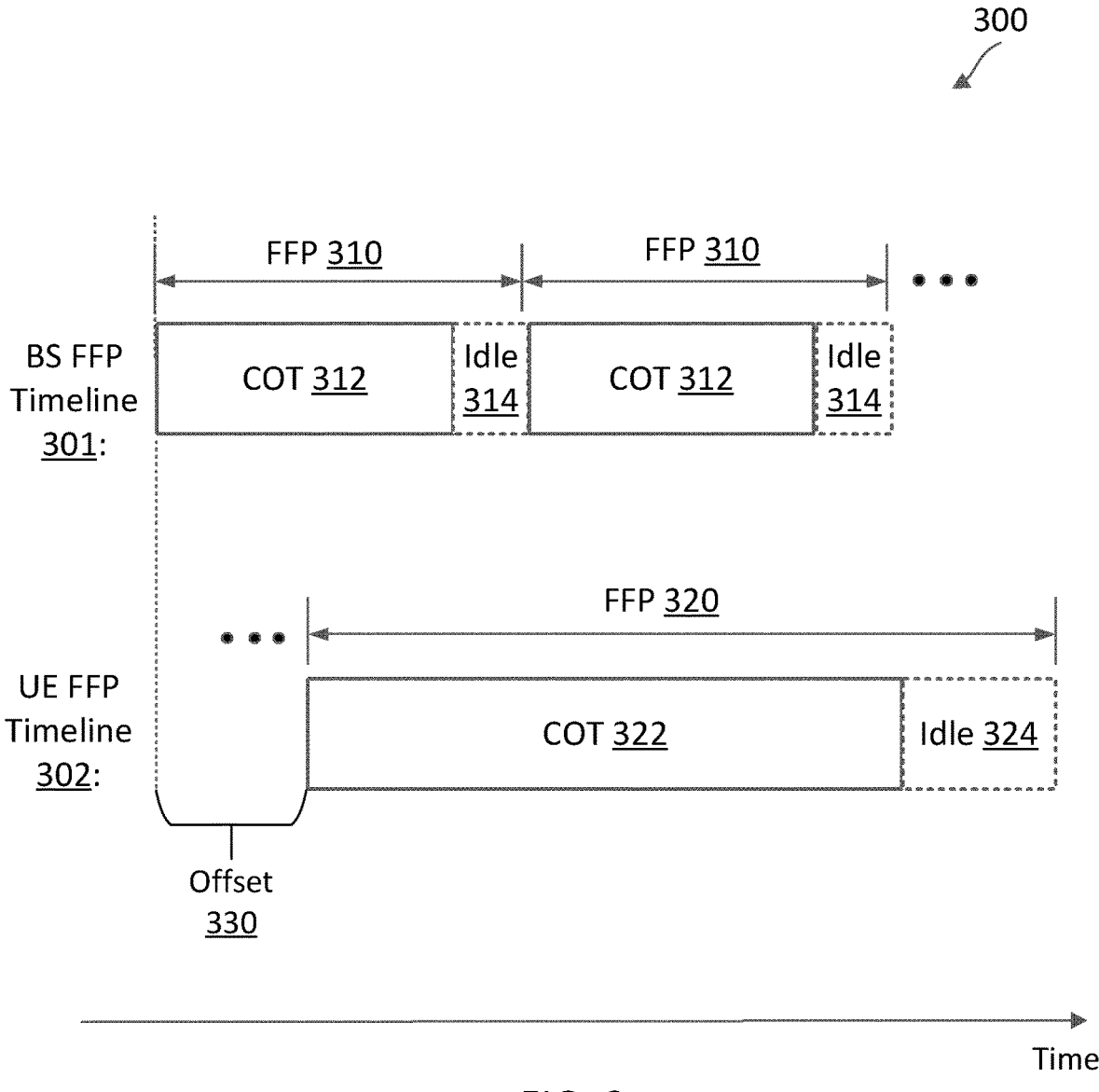
FIG. 3 is a timing diagram illustrating a frame-based equipment (FBE) frame configuration scheme according to some aspects of the present disclosure.

FIG. 3 is a timing diagram illustrating an FBE frame configuration scheme 300 according to some aspects of the present disclosure. The scheme 300 may be employed by BSs such as the BSs 105 and/or UEs such as the UEs 115 in a network such as the network 100 for communications. In particular, the BS may communicate with the UE in an FBE mode, for example, over a shared radio frequency band in an unlicensed spectrum or shared spectrum, using the FBE frame configuration scheme 300. The scheme 300 may be used in various scenarios, including IIOT and/or URLLC scenarios. Additionally, the scheme 300 may be employed in conjunction with the radio frame structure 200. In FIG. 3, the x-axis represents time in some arbitrary units.

In the scheme 300, a BS 105 may configure a plurality of FFPs 310 for channel access (e.g., in a shared channel or shared radio frequency band) as shown by the BS FFP timeline 301. The FFPs 310 may be periodic. Each FFP 310 includes a COT 312 and an idle period 314. The FFPs 310 may also be referred to as FBE frames and the duration of an FFP 310 may be referred to as a frame period, an FBE frame period, or a frame length. The COT 312 may also be referred to as a transmission period. The BS 105 may perform channel sensing or LBT in the idle period 314 and may access the channel during a COT 312 in a subsequent FFP 310. Although FIG. 3 illustrates the idle period 314 located at the end of the FFP 310, it should be understood that in other examples the idle period of an FFP 310 can be located at the beginning of the FFP 310. In some aspects, some regulations may restrict the COT 312 to be no longer than 95% of the frame length (the duration of the FFP 310) and the idle period to be no shorter than 5% of the frame length. In some aspects, some regulations may further restrict the idle period 314 to be no longer than 100 microseconds (µs).

In some aspects, each FFP 310 is restricted to a duration of about 1 ms, 2 ms, 2.5 ms, 4 ms, 5 ms, or 10 ms. The starting positions of the FFPs 310 within every two radio frames (e.g., the radio frames 201) may start from an even radio frame and are given by:

$$i*P; i=\{0,1,\ldots,20/P-1\}, \tag{1}$$

where P is a duration of an FFP 310. Additionally, the duration of an idle period 314 for a given SCS is given by:

$$\text{ceiling(minimum idle period allowed by regulations/}Ts), \tag{2}$$

where Ts is a symbol duration for the SCS.

In some aspects, the BS 105 may notify an FBE mode with a configuration for the FFPs 310 to the UE 115, for example, in an RMSI field of a broadcast channel (BCH) payload. The FFP configuration may be included in System Information Block (SIB) Type 1. SIB1 may include information relevant for a UE to evaluate whether the UE is allowed to access a corresponding cell. Also, SIB1 may provide the UE 115 with the scheduling of other system information (OSI). In some aspects, the RMSI field in the PBCH load may indicate whether an FBE mode (e.g., a semi-static channel access mode) or an LBE mode is to be used for channel access. In some aspects, the BS 105 may also notify the UE 115 with PRACH resources (random access occasions) where the UE 115 may transmit a random access preamble to initiate a network access with the BS 105. In some instances, when operating in the FBE mode, the BS 105 and/or the UE 115 may consider a PRACH resource overlapping or partially overlapping with an idle period 314 of the FFPs 310 as invalid. In other words, the UE 115 may not use a PRACH resource that overlaps or partially overlaps with an idle period 314 for random access preamble transmissions, and the BS 105 may not monitor for random access preamble in a PRACH resource that overlaps or partially overlaps with an idle period 314.

In some aspects, the BS 105 may perform an LBT in an idle period 314 to gain access to a COT 312 in a subsequent FFP 310. The LBT may be a CAT2 LBT. It should be noted that a CAT2 LBT in an FBE mode is different from a CAT2 LBT in an LBE mode. For instance, a CAT2 LBT in an LBE mode may include a channel signal energy measurement (e.g., a one-shot channel signal energy measurement) over a measurement duration of about 25 μs or about 16 μs prior to a transmission. A CAT2 LBT in an FBE mode may include one channel signal energy measurement over a measurement duration of at least 4 μs within a 9 μs sensing interval immediately before a transmission.

After gaining access to the COT 312, the BS 105 may communicate UL and/or DL communications with the UE 115 during the COT 312. The BS 105 and the UE 115 may communicate multiple UL and/or DL communications in the COT 312 without performing another LBT. However, if there is a gap of 16 μs or more from the end of a previous UL/DL transmission to a start of a DL transmission in the COT 312, the BS 105 may perform a CAT2 LBT prior to the DL transmission. Similarly, if there is a gap of 16 μs or more from the end of a previous UL/DL transmission to a start of an UL transmission, the UE 115 may perform a CAT2 LBT prior to the UL transmission.

The configuration or frame structure of the FFPs 310 broadcasted by the BS 105 may allow the UE 115 to monitor for a COT indication from the BS 105 and/or aware of the duration and/or time location of the BS's 105 COT. As discussed above, after the BS 105 gains access or win a COT 312, the BS 105 may transmit a DL transmission in the COT 312. The UE 115 may monitor for DL transmissions from the BS 105. In some instances, the UE 115 may transmit an UL transmission within an FFP 310 upon detecting a DL transmission (e.g., a PDCCH signal, an SSB, a PBCH signal, RMSI, GC-PDCCH signal, and/or the like) from the BS 105 in the FFP 310. The detection of a DL transmission from the BS 105 in the FFP 310 may serve to indicate that the BS 105 has successfully acquired the COT 312 in the FFP 310.

In some aspects, if the BS 105 indicates FBE mode of operations and provides the UE 115 with a fallback UL and/or DL grant (downlink control information (DCI)) indicating a CAT2 LBT or a CAT4 LBT, the UE 115 may follow mechanisms whereby one channel signal energy measurement is measured over a 9 μs duration (e.g., one-shot LBT) within a 25 μs interval prior to the transmission. In some aspects, the BS 105 may indicate RMSI scheduling using fallback DCI. A same 2-bit field for LBE mode in the fallback DCI may be used or reinterpreted to indicate an FBE LBT type, a CP extension, and/or a channel access priority class (CAPC) indication.

As discussed above, in some aspects, it may be desirable for a UE to initiate or acquire a COT and communicate with the BS in the UE-initiated COT. Accordingly, the BS 105 may additionally configure a configuration for the UE to initiate a COT in an FBE mode. For instance, the BS 105 configures the UE 115 with a plurality of FFPs 320. For simplicity of illustration, the UE FFP the timeline 302 illustrates one UE FFP 320. However, the UE FFP 320 is periodic (repeating in time with one UE FFP 320 after another UE FFP 320 similar to the BS FFPs 310). The UE FFPs 320 may have a similar structure as the BS FFPs 310. Each UE FFP 320 includes a COT 322 followed by an idle period 324. The duration of the COT 322 and the duration of the idle period 324 in the UE FFPs 320 may be defined using similar rules as the COT 312 and idle period 314 in the BS FFPs 310. For instance, the COT 322 may be no longer than 95% of the frame length (the duration of the FFP 320) and the idle period 324 may be a maximum between 5% of the frame length and 100 μs as discussed above. Additionally, the BS 105 may configure the UE FFPs 320 to start at a different time than the BS FFPs 310. As shown, the start or boundaries of the UE FFPs 320 is offset or misaligned from start or boundaries of the BS FFPs 310 by an offset 330, which also leads to an offset between idle periods 324 of the UE 115 and idle periods 314 of the BS 105. Offsetting the idle periods 314 between the BS 105 and the UE 115 allows the BS 105 and the UE 115 to perform LBT (contend for channel access) at different times. As shown, the BS FFPs 310 starts before the UE FFPs 320, and thus the BS 105 may have a higher channel access priority than the UE 115.

Although FIG. 3 illustrates the UE FFPs 320 having a longer duration than the BS FFPs 310, it should be understood that in other examples the UE FFPs 320 can have the same duration as the BS FFPs 310 or a shorter duration than the BS FFPs 310. In some aspects, the BS 105 may configure the UE FFPs 320 independently or separately from the BS FFPs 310. For instance, the BS 105 may select a frame period (duration) for the UE FFPs 320 from a first set of frame periods and may select a frame period for the BS FFP 310 from a second set of frame periods. In some aspects, the first set of frame periods and the second set of frame periods may include at least one different frame period. In some instances, the second set of frame periods (where the BS FFP 310 is selected from) may include {1 ms, 2 ms, 2.5 ms, 4 ms, 5 ms, 10 ms}, and the first set of frame periods (where the UE FFP 320 is selected from) may include at least one different frame period than the second set. In some aspects, the first set of frame periods (where the UE FFP 320 is selected from) may be a new set of frame periods different from {1 ms, 2 ms, 2.5 ms, 4 ms, 5 ms, 10 ms}. In some other aspects, the first set of frame periods (where the UE FFP 320 is selected from) may be the same as the second set of frame periods (where the BS FFP 310 is selected from). For instance, each of the first and second set of frame periods may include {1 ms, 2 ms, 2.5 ms, 4 ms, 5 ms, 10 ms}.

In some aspects, the BS 105 may configure a frame period for a UE FFP 320 according to or relative to a frame period of a BS FFP 310. For instance, the frame period of the UE FFP 320 can be an integer multiple (e.g., 2, 3, 4 or more) of the frame period of the BS FFP 310. For example, in FIG. 3, the frame period of the UE FFP 320 may be twice the frame period of the BS FFP 310. Alternatively, the period of the UE FFP 320 can be an integer factor of the frame period of the BS FFP 310 (e.g., shown in FIG. 4).

In some aspects, the BS 105 may notify the configuration or frame structure of the UE FFPs 320 to the UE 115, for example, via a broadcast configuration or a UE-specific configuration. In some instances, the broadcast configuration or the UE-specific configuration can be an RRC configuration. The configuration may include an indication of a frame period (duration) for the UE FFPs 320. The configuration may also include a start time (e.g., the offset with respect to a boundary of the BS FFPs 310) for the UE FFPs 320. The configuration may be used by the UE 115 to perform channel access, for example, by performing LBT in the channel at fixed time instants (during idle periods 324 of the FFPs 320).

To initiate a COT 322 in a UE FFP 320, the UE 115 may perform an LBT or CCA during the idle period 324 of a preceding UE FFP 320 to sense if the channel is available. If the channel is busy, the UE 115 may back off for a fixed period 322 and senses the channel again (in a next idle period 314) after the fixed period 322. In some instances, the UE 115 may measure the energy level during the COT 322, and if the energy level is lower than a threshold and if the UE 115 detected the channel is idle, the UE 115 may start transmitting data immediately in the COT 322. In some aspects, the LBT may be an FBE mode CAT2 LBT as discussed above.

After gaining access to the COT 322, the UE 115 may transmit a UL communication signal (e.g., including uplink data and/or uplink control information (UCI)) to the BS 105. In some aspects, the UE 115 may use a configured grant resource within the COT 322 for the UL transmission. In some other aspects, the UE 115 may have received a grant for the UL transmission from the BS 105. For instance, the BS 105 may transmit the grant within a certain COT 312 acquired by the BS 105, and the transmission time for the UL transmission may be outside of the BS 105's acquired COT 312.

Figure 4:
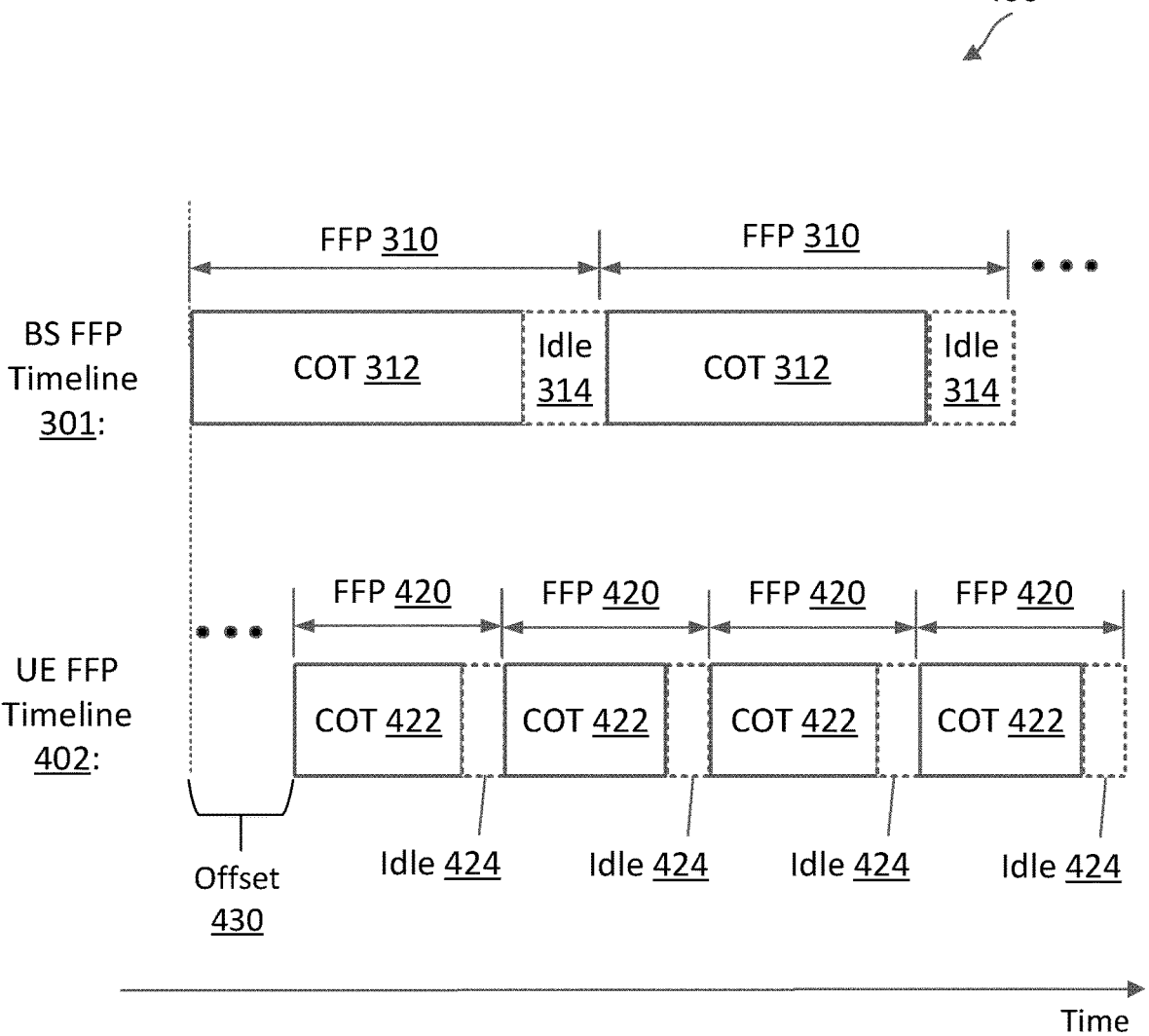
FIG. 4 is a timing diagram illustrating an FBE frame configuration scheme according to some aspects of the present disclosure.

FIG. 4 is a timing diagram illustrating an FBE frame configuration scheme 400 according to some aspects of the present disclosure. The scheme 400 may be employed by BSs such as the BSs 105 and/or UEs such as the UEs 115 in a network such as the network 100 for communications. In particular, the BS may communicate with the UE in an FBE mode, for example, over a shared radio frequency band in an unlicensed spectrum or shared spectrum, using the FBE frame configuration scheme 400. The scheme 400 may be used in various scenarios, including IIOT and/or URLLC scenarios. Additionally, the scheme 400 be employed in conjunction with the radio frame structure 200. In FIG. 4, the x-axis represents time in some arbitrary units. The scheme 400 is described using the same BS FFP timeline as in FIG. 3, and may use the same reference numerals as in FIG. 3 for simplicity's sake. The scheme 400 is substantially similar to the scheme 300. However, the BS 105 may configure the UE 115 with UE FFPs 420 having a duration or frame period that is an integer factor (e.g., ½, ⅓, ¼, ⅕, ⅙, etc.) of the FFPs 310. For instance, the BS 105 may determine a frame period or duration for a UE FFP 420 by sub-dividing a frame period of a BS FFP 310.

In the illustrated example of FIG. 4, the BS 105 configures the UE 115 with a plurality of FFPs 420 shown by the UE FFP timeline 402. The UE FFPs 420 may have a similar structure as the BS FFPs 310. Each UE FFP 420 includes a COT 422 followed by an idle period 424. The duration of the COT 422 and the duration of the idle period 424 in the UE FFPs 420 may be defined using similar rules as the COT 312 and idle period 314 in the BS FFPs 310. For instance, the COT 422 may be no longer than 95% of the frame length (the duration of the FFP 420) and the idle period 424 may be a maximum between 5% of the frame length and 100 as discussed above. Additionally, the BS 105 may configure the UE FFPs 420 to start at a different time than the BS FFPs 310. For instance, the start of a UE FFP 420 may be offset from a start of a BS FFP 310 by an offset 430.

Similar to the scheme 300, the BS 105 may transmit a configuration (e.g., a broadcast configuration or a UE-specific configuration) to notify the UE 115 of the frame structure of the UE FFPs 420. For instance, the configuration may include an indication of a frame period or duration of each UE FFP 420 and/or the offset 430. Accordingly, the UE 115 may initiate or acquire a COT 422 according to the UE FFPs 420. For instance, the UE 115 may perform a CAT2 LBT (e.g., an FBE mode CAT2 LBT) during an idle period 424 of a UE FFP 420 to acquire a COT 422 in a subsequent FFP 420. After winning the COT 422, the UE 115 may transmit an UL communication signal (e.g., including UL data and/or UCI) to the BS 105 in the COT 422.

Figure 5:
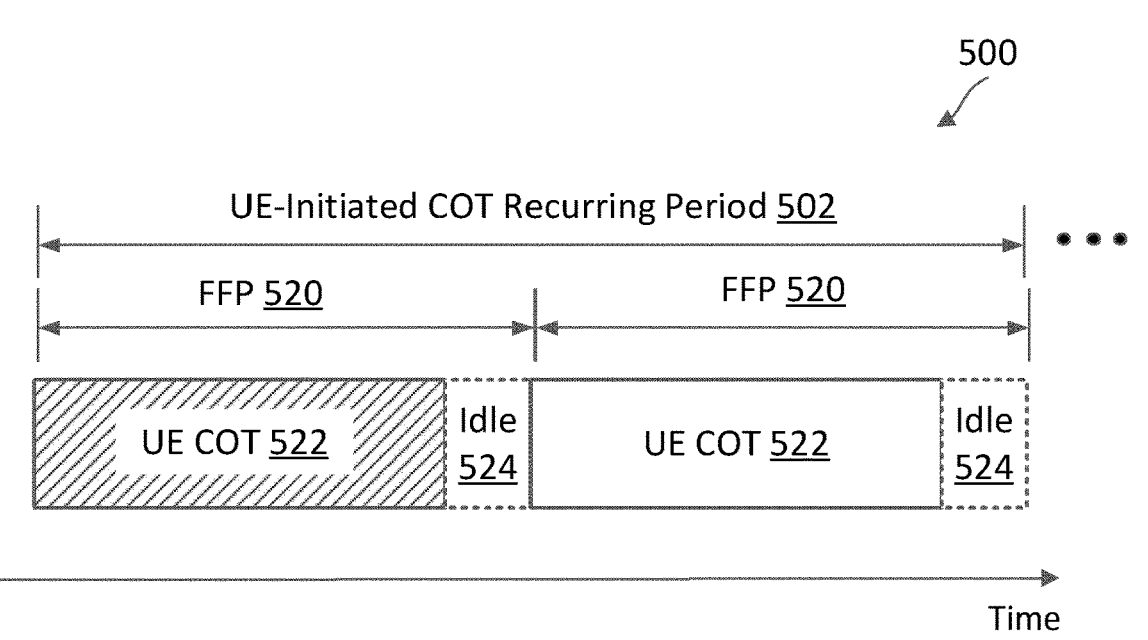
FIG. 5 is a timing diagram illustrating an FBE frame configuration scheme according to some aspects of the present disclosure.
Figure 6:
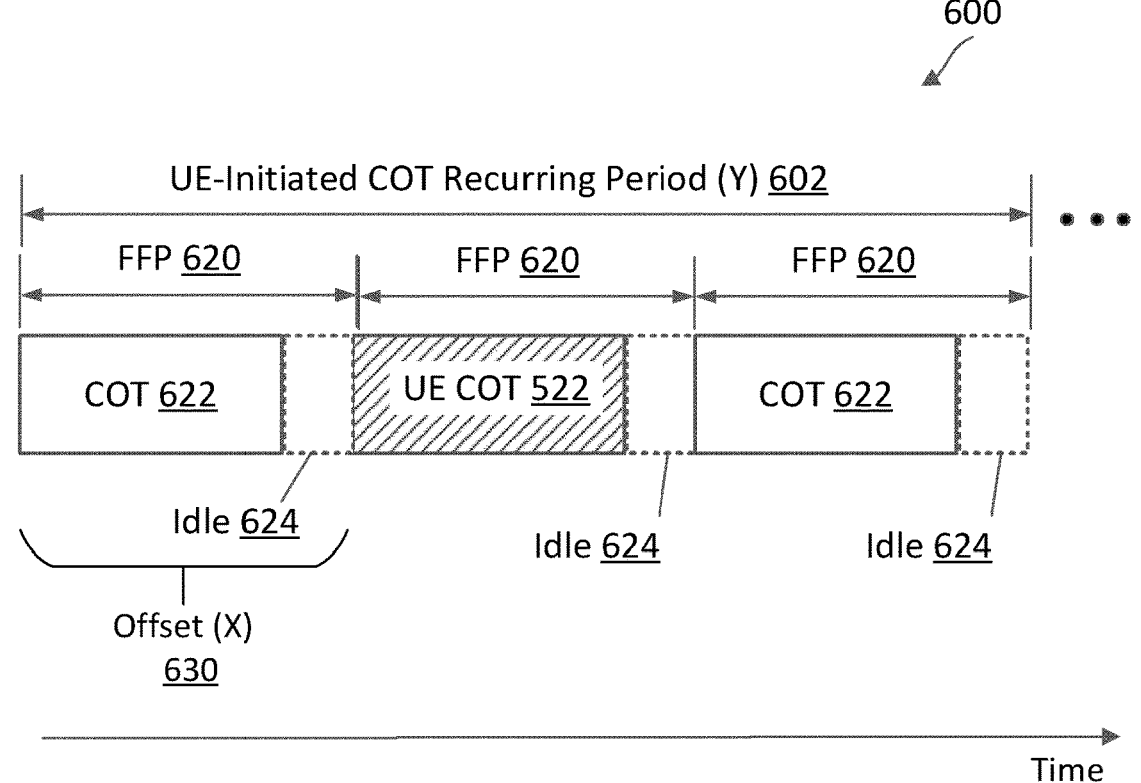
FIG. 6 is a timing diagram illustrating an FBE frame configuration scheme according to some aspects of the present disclosure.

In some aspects, a certain regulation may limit the maximum FFP size or length to be about 10 ms irrespective of whether the channel access or COT is acquired by a BS 105 or a UE 115. However, in some aspects, a UE 115 may have traffic with a periodicity longer than 10 ms. Accordingly, it may be desirable for the BS 105 to separately configure the UE 115 with a UE-initiated COT periodicity (e.g., how often the UE 115 may initiate a COT) and a UE FFP frame structure (e.g., when the UE 115 may initiate a COT and the duration of a UE COT). FIGS. 5 and 6 illustrate various mechanisms for configuring UE COT periodicity and UE FFP frame structure.

FIG. 5 is a timing diagram illustrating an FBE frame configuration scheme 500 according to some aspects of the present disclosure. The scheme 500 may be employed by BSs such as the BSs 105 and/or UEs such as the UEs 115 in a network such as the network 100 for communications. In particular, the BS may configure the UE to initiate a COT, for example, over a shared radio frequency band in an unlicensed spectrum or shared spectrum, using the FBE frame configuration scheme 500. The scheme 500 may be used in various scenarios, including IIOT and/or URLLC scenarios. Additionally, the scheme 500 be employed in conjunction with the radio frame structure 200 and/or the schemes 300 and/or 400. In FIG. 5, the x-axis represents time in some arbitrary units.

In the scheme 500, a BS 105 may configure a UE 115 with a UE-initiated COT recurring period 502 and a plurality of UE FFPs 520 that repeat in time. The UE FFPs 520 may have a similar structure as the FFPs 310, 320, and/or 420. For instance, each UE FFP 520 includes a COT 522 followed by an idle period 524. The duration of the COT 522 and the duration of the idle period 524 in the UE FFPs 520 may be defined using similar rules as the COT 312 and idle period 314 in the BS FFPs 310 as discussed above in relation to FIG. 3. In some aspects, the UE FFPs 520 may correspond to the UE FFPs 320 of FIG. 3 or the UE FFPs 420 of FIG. 4.

The UE-initiated COT recurring period 502 may be a periodicity at which the UE 115 may initiate a COT 522. In some aspects, the BS 105 may configure the UE-initiated COT recurring period 502 to be longer than the duration or period of a UE FFP 520. In the illustrated example of FIG.

5, the UE-initiated COT recurring period 502 includes two UE FFPs 520. Additionally, the BS 105 may configure the UE 115 to initiate a COT in a beginning UE FFP 520 within the UE-initiated COT recurring period 502. In other words, the UE 115 may initiate a COT 522 (shown by the pattern-filled box) in an FFP 520 with a starting boundary aligned to a boundary of the UE-initiated COT recurring period 502. The UE 115 may refrain from initiating a COT 522 in an FFP 520 with a starting boundary that is not aligned to the boundary of the UE-initiated COT recurring period 502. In general, the BS 105 may allow the UE 115 to initiate a COT 522 in a single FFP 520 within the UE-initiated COT recurring period 502 and the single FFP 520 may be any one of the FFPs 520 within the UE-initiated COT recurring period 502.

As an example, the UE FFP 520 may have a period or duration of about 10 ms and the UE-initiated COT recurring period 502 may be about 20 ms. As such, the UE 115 may initiate a COT 522 as often as every 20 ms at the beginning of each UE-initiated COT recurring period 502. For instance, the UE 115 may initiate or acquire the COT 522 (the pattern-filled box) by performing an LBT (e.g., an FBE mode CAT2 LBT) during an idle period 524 of a preceding FFP 520 (immediately before the COT 522). Upon gaining access to the COT 522, the UE 115 may transmit an UL transmission (e.g., a PUSCH signal or a PUCCH signal) to the BS 105 during the COT 522.

FIG. 6 is a timing diagram illustrating an FBE frame configuration scheme 600 according to some aspects of the present disclosure. The scheme 500 may be employed by BSs such as the BSs 105 and/or UEs such as the UEs 115 in a network such as the network 100 for communications. In particular, the BS may configure the UE to initiate a COT, for example, over a shared radio frequency band in an unlicensed spectrum or shared spectrum, using the FBE frame configuration scheme 600. The scheme 600 may be used in various scenarios, including IIOT and/or URLLC scenarios. Additionally, the scheme 500 be employed in conjunction with the radio frame structure 200 and/or the schemes 300 and/or 400. In FIG. 6, the x-axis represents time in some arbitrary units. The scheme 600 may be substantially similar to the scheme 500, but may provide more flexibility in configuring the location where the UE may initiate a COT within a UE-initiated COT recurring period.

In the scheme 600, a BS 105 may configure a UE 115 with a UE-initiated COT recurring period 602 and a plurality of UE FFPs 620 that repeat in time. The UE FFPs 620 may have a similar structure as the FFPs 310, 320, 420, and/or 520. For instance, each UE FFP 620 includes a COT 622 followed by an idle period 624. The duration of the COT 622 and the duration of the idle period 624 in the UE FFPs 620 may be defined using similar rules as the COT 312 and idle period 314 in the BS FFPs 310 as discussed above in relation to FIG. 3. In some aspects, the UE FFPs 620 may correspond to the UE FFPs 320 of FIG. 3 or the UE FFPs 420 of FIG. 4.

The BS 105 may indicate to the UE 115 the location where the UE 115 may initiate a COT within a UE-initiated COT recurring period 602 by indicating a length or duration of the UE-initiated COT recurring period 602 and an offset 630 relative to the start of the UE-initiated COT recurring period 602 where the UE 115 may initiate a COT 622. In some aspects, the BS 105 may indicate the duration of the UE-initiated COT recurring period 602 and the offset 630 in units of UE FFPs 620. For instance, the BS 105 may transmit a configuration including an indication of a first number (e.g., denoted as X) of UE FFPs 620 within the UE-initiated COT recurring period 602 and an indication of a second number (e.g., noted as Y) of the UE FFPs 620 for the offset 630.

As an example, the UE FFP 620 may have a period or duration of about 10 ms, the UE-initiated COT recurring period 602 may be about 30 ms, and thus the configuration may indicate an X value of 3 and a Y value of 1. As such, the UE 115 may initiate a COT 622 as often as every 3 UE FFPs 620 (e.g., every 30 ms) in an FFP 620 with a start that is offset from a boundary of the UE-initiated COT recurring period 602 by one UE FFP 620. For instance, the UE 115 may initiate or acquire a COT 622 by performing an LBT (e.g., an FBE mode CAT2 LBT) during an idle period 624 of a preceding FFP 620 (immediately before the COT 622). Upon gaining access to the COT 622, the UE 115 may transmit an UL transmission (e.g., a PUSCH signal or a PUCCH signal) to the BS 105 during the COT 622.

In some aspects, a BS 105 may configure a UE 115 to initiate a COT in an FBE mode using any suitable combination of the schemes 300, 400, 500, and/or 600. Additionally, after the UE 115 acquires a COT in an FFP (e.g., the FFPs 320, 420, 520, and/or 620), the UE 115 may transmit an UL transmission to the BS 105 in a portion of the COT, and share a subsequent portion of the COT with the BS 105 for a DL communication as will be discussed more fully below in relation to FIG. 7.

Figure 7:
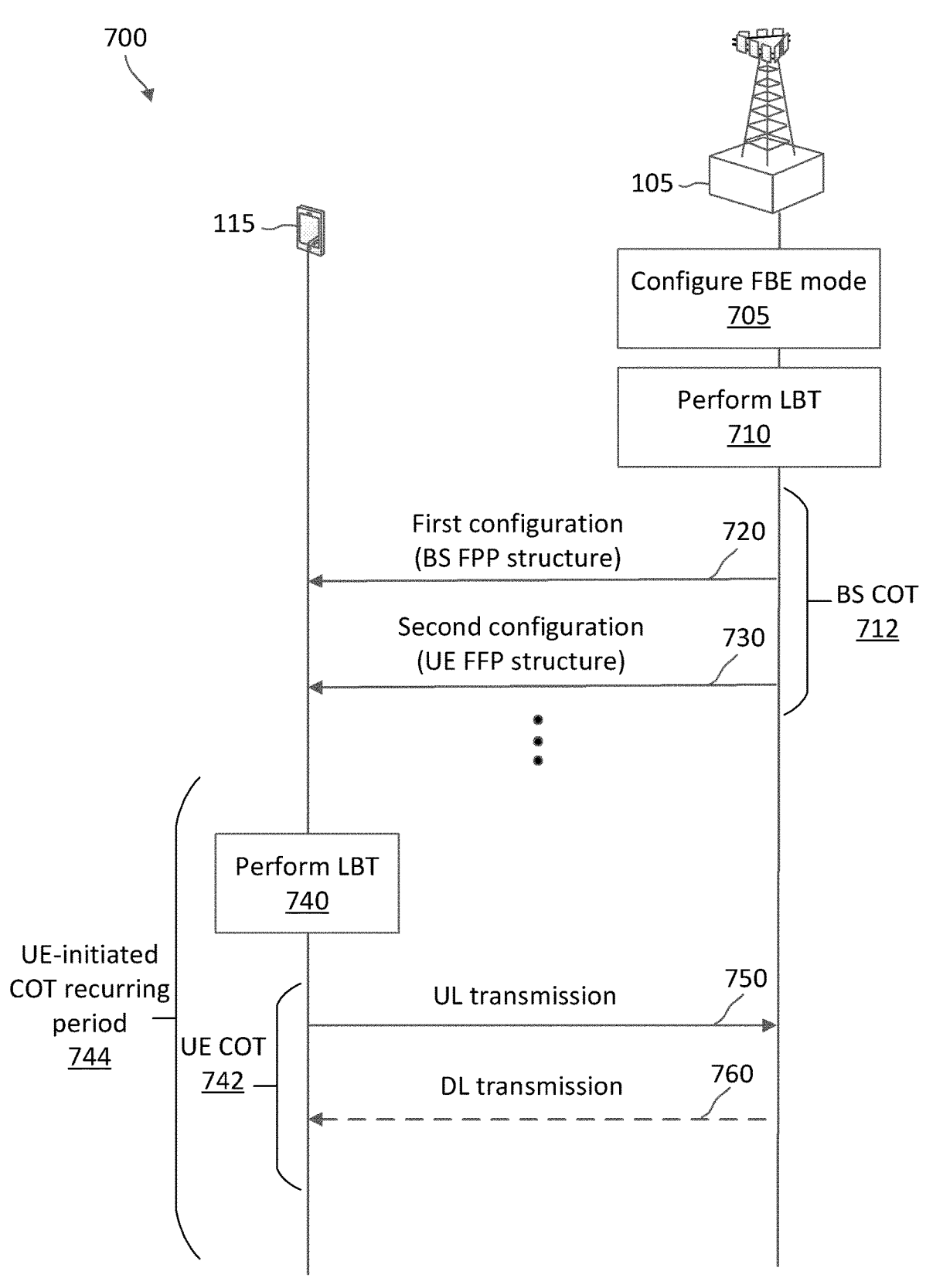
FIG. 7 is a sequence diagram illustrating an FBE-based communication method according to some aspects of the present disclosure.

FIG. 7 is a sequence diagram illustrating an FBE-based communication method 700 according to some aspects of the present disclosure. The method 700 may be implemented between a UE 115 and a BS 105 in the network 100. The method 700 may employ similar mechanisms as discussed above in relation to FIGS. 3-6. In some aspects, the UE 115 may utilize one or more components, such as the processor 902, the memory 904, the FBE module 908, the transceiver 910, the modem 912, and the one or more antennas 916 of FIG. 9, to execute the steps of method 700. In some aspects, the BS 105 may utilize one or more components, such as the processor 802, the memory 804, the FBE module 808, the transceiver 810, the modem 812, and the one or more antennas 816 of FIG. 8, to execute the steps of method 700. As illustrated, the method 700 includes a number of enumerated actions, but aspects of the method 700 may include additional actions before, after, and in between the enumerated actions. In some aspects, one or more of the enumerated actions may be omitted or performed in a different order.

At action 705, the BS 105 configures an FBE mode for channel access over a shared radio frequency band (e.g., in an unlicensed spectrum or a shared spectrum). For instance, the BS 105 may determine a plurality of BS FFPs (e.g., the FFPs 310) for the BS 105 to indicate a COT in the channel. The BS 105 may also determine a plurality of UE FFPs (e.g., the FFPs 320, 420, 520, and/or 620) for the UE 115 to indicate a COT in the channel.

In some aspects, the BS 105 may separately select a frame period (duration) for the UE FFPs and a frame period for the BS FFPs. In some aspects, the BS 105 may select a frame period for the UE FFPs from a first set of frame periods and may select a frame period for the BS FFP from a second set of frame periods. In some aspects, the first set of frame periods and the second set of frame periods may include at least one different frame period. In some other aspects, the first set of frame periods may be the same as the second set of frame periods. For instance, at least one of the first set of frame periods or the second set of frame periods may include periods of 1 ms, 2 ms, 2.5 ms, 4 ms, 5 ms, and 10 ms. In some aspects, the frame period of each UE FFP may be different from the frame period of each BS FFP. In some other aspects, the frame period of each UE FFP may be the same as the frame period of each BS FFP.

In some aspects, the BS 105 may configure a frame period for a UE FFP based on a frame period of a BS FFP. For instance, the frame period of the UE FFP can be an integer multiple (e.g., 2, 3, 4 or more) of the frame period of the BS FFP, for example, as discussed above in relation to FIG. 3. In some other instances, the frame period of the UE FFP can be an integer factor of the frame period of the BS FFP, for example, as discussed above in relation to FIG. 4.

In some aspects, the BS 105 may determine a time offset (e.g., the offsets 330 and 430) between the start of a UE FFP and the start of a BS FFP, for example, to avoid having the UE 115 to compete with the BS 105 in contending for a COT and/or allow the UE 115 to have different opportunities to contend for a COT than the BS 105. In some instances, the BS 105 may configure the start of the BS FFP to be ahead of the start of the UE FFP, for example, to provide the BS 105 with a higher channel access priority than the UE 115.

In some aspects, the BS 105 may also determine a periodicity (e.g., the UE-initiated COT recurring periods 502 and/or 602) at which the UE 115 may contend for a COT separately from the frame period of the UE FFPs. For instance, the BS 105 configure a UE-initiated COT recurring periods to be longer than the frame period of the UE FFP as discussed above in relation to FIGS. 5 and 6. For example, the UE-initiated COT recurring period can include multiples UE FFPs (e.g., about 2, 3, 4, 5, 6 or more). The BS 105 may determine the UE-initiated COT recurring period based on a traffic periodicity at the UE 115.

At action 710, the BS 105 performs an LBT during an idle period (e.g., the idle period 314) within a BS FFP to contend for a COT (e.g., the COT 312) in a subsequent BS FFP. The LBT may be an FBE mode CAT2 LBT. For instance, the BS 105 may measure signal energy in the channel over a measurement duration of at least 4 μs within a 9 μs sensing interval immediately before the COT. The BS 105 may receive a signal from the channel and compute a power of the received signal. If the measurement is below a certain threshold, the channel is available or idle. Otherwise, the channel is occupied or busy. For instance, the LBT is successful (where the channel signal energy measurement is below the threshold), the BS 105 gains the COT (e.g., shown as BS COT 712).

At action 720, after winning the COT 712, the BS 105 transmits a first configuration indicating a BS FFP structure to the UE 115 during the COT 712. The first configuration may indicate an FBE mode of operations (e.g., semi-static channel access), a frame period (duration) of the BS FFP, a duration of the idle period in the BS FFP, and/or an alignment of the boundary of BS FFP with respect to a boundary of a radio frame (e.g., the radio frame 201). In some aspects, the first configuration may be an RRC configuration (e.g., RMSI or SIB1). Accordingly, the UE 115 may receive the first configuration.

At action 730, the BS 105 transmits a second configuration indicating a UE FFP structure to the UE 115. The second configuration may a frame period (duration) of the UE FFP, a duration of the idle period in the UE FFP, and/or an alignment (e.g., the offsets 330 and/or 430) of the boundary of UE FFP with respect to a boundary of the BS FFP. The second configuration may also indicate the UE-initiated COT recurring period. In some aspects, the second configuration may further indicate that the UE 115 may initiate a COT in an FFP with a starting boundary aligned to a boundary of the UE-initiated COT recurring period, for example, as discussed above in relation to FIG. 5. In some aspects, the second configuration may further indicate that the UE 115 may initiate a COT in an FFP offset from a boundary of the UE-initiated COT recurring period. For instance, the second configuration may include an indication of a first number (e.g., X) of UE the FFPs in the UE-initiated COT recurring period and an indication of a second number (e.g., Y) of the UE FFPs in the offset, for example, as discussed above in relation to FIG. 6. In some aspects, the second configuration may be an RRC configuration (e.g., in a broadcast communication or a UE-specific communication specific to the UE 115). Accordingly, the UE 115 may receive the second configuration. Although FIG. 7 illustrates the BS 105 transmitting the first and second configuration separately, it should be understood that in other examples the BS 105 may indicate the first and second configuration in a single configuration. Accordingly, the UE 115 may receive the first and second configurations in a single configuration.

At action 740, the UE 115 performs an LBT during an idle period (e.g., the idle period 314) within a UE FFP based on the second configuration to contend for a COT (e.g., the COT 312) in a subsequent UE FFP. The LBT may be an FBE mode CAT2 LBT. The UE 115 may use substantially similar mechanisms as the BS 105 as discussed above at action 710. For instance, the LBT is successful (where the channel signal energy measurement is below the threshold), the UE 115 gains the COT (e.g., shown as UE COT 742). In some aspects, the UE 115 may initiate the COT 742 further based on the UE-initiated COT recurring period (e.g., shown as UE-initiated COT recurring period 744) indicated by the second configuration. For instance, the UE 115 may initiate the UE COT 742 within a UE FFP offset from a boundary of the UE-initiated COT recurring period as configured by the second configuration.

At action 750, after winning the COT 742, the UE 115 transmits a UL transmission to the BS 105 during the COT 742. The UL transmission may include UL data (e.g., PUSCH data) and/or UCI (e.g., channel state information (CSI), scheduling request (SR), HARQ ACK/NACK, etc.).

In some aspects, the UE 115 may share the UE COT 742 with the BS 105. For instance, after the UE 115 completes the UL transmission (from action 750), there may be remaining time in the COT 742. The BS 105 may utilize the remaining duration in the COT 742 for a DL transmission (e.g., DL broadcast communication or UE-specific communication) as shown by the dashed line at action 760. In some aspects, the BS 105 may configure the UE 115 with a COT sharing configuration (e.g., a duration and/or a start within a UE COT for sharing).

Figure 8:
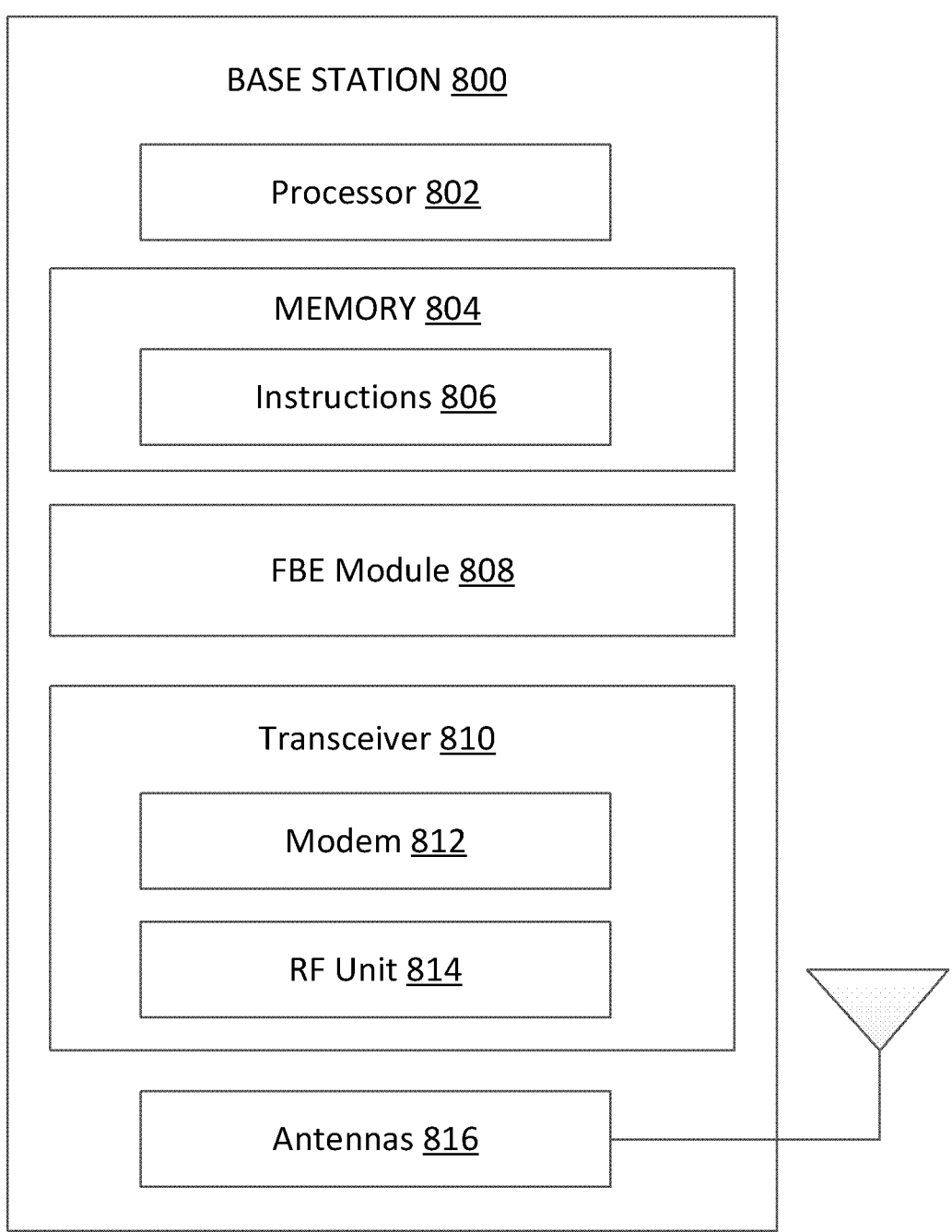
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 in the network 100 as discussed above in FIG. 1. As shown, the BS 800 may include a processor 802, a memory 804, an FBE module 808, a transceiver 810 including a modem subsystem 812 and an RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-7 and 11. Instructions 806 may also be referred to as code, which may be interpreted broadly to include any type of computer-readable statement(s) as discussed above.

The FBE module 808 may be implemented via hardware, software, or combinations thereof. For example, the FBE module 808 may be implemented as a processor, circuit, and/or instructions 806 stored in the memory 804 and executed by the processor 802. In some instances, the FBE module 808 can be integrated within the modem subsystem 812. For example, the FBE module 808 can be implemented by a combination of software components (e.g., executed by a DSP or a general processor) and hardware components (e.g., logic gates and circuitry) within the modem subsystem 812.

The FBE module 808 may communicate with various components of the BS 800 to perform various aspects of the present disclosure, for example, aspects of FIGS. 1-7 and 11. For instance, the FBE module 808 is configured to transmit a configuration for a UE (e.g., the UEs 115) to initiate a COT (e.g., the COTs 322, 422, 522, 622, and/or 742) in an FBE mode. The configuration indicates a first FBE frame period (e.g., a period or duration of a UE FFP such as the UE FFPs 320, 420, 520, and/or 620). In some aspects, the first FBE frame period is one of a first set of FBE frame periods associated with the UE. The FBE module 808 may be configured to transmit the configuration in a second FBE frame (e.g., the BS FFPs 310) having a second FBE frame period, where the second FBE frame period is one of a second set of FBE frame periods associated with the BS. In some aspects, the first FBE frame period is different than the second FBE frame period. In some aspects, the first set of FBE frame periods and the second set of FBE frame periods include at least one different FBE frame period. In some aspects, the first set of FBE frame periods is the same as the second set of FBE frame periods. In some aspects, the first FBE frame period is an integer multiple of the second FBE frame period, for example, as discussed above in relation to FIG. 3. In some aspects, the first FBE frame period is an integer factor of the second FBE frame period, for example, as discussed in relation to FIG. 4. In some aspects, the configuration is an RRC configuration.

The FBE module 808 is further configured to receive an uplink communication signal, from the UE during a COT associated with the UE. The COT is within a first FBE frame having the first FBE frame period. For instance, the COT is initiated or acquired by the UE according to the configuration. In some aspects, the COT is based on a UE-initiated COT recurring period that is longer than the first FBE frame period, for example, as discussed above in relation to FIGS. 5 and/or 6. In some aspects, the UE-initiated COT recurring period is an integer multiple of the first FBE frame period. In some aspects, a boundary of the first FBE frame is aligned to a boundary of the UE-initiated COT recurring period. In some aspects, the configuration may further indicate the UE-initiated COT recurring period. In some aspects, a start of the first FBE frame is offset from a boundary of the UE-initiated COT recurring period. In some aspects, the configuration may further indicate the UE-initiated COT recurring period and the offset. In some aspects, the configuration may include an indication of a first number of the first FBE frame periods in the UE-initiated COT recurring period and an indication of a second number of the first FBE frame periods in the offset.

As shown, the transceiver 810 may include the modem subsystem 812 and the RF unit 814. The transceiver 810 can be configured to communicate bi-directionally with other devices, such as the UEs 85 and/or another core network element. The modem subsystem 812 may be configured to modulate and/or encode data according to a MCS, e.g., a LDPC coding scheme, a turbo coding scheme, a convolutional coding scheme, a polar coding scheme, a digital beamforming scheme, etc. The RF unit 814 may be configured to process (e.g., perform analog to digital conversion or digital to analog conversion, etc.) modulated/encoded data (e.g., PDCCH, PDSCH, configured grants, dynamic scheduling grants, RRC configuration, SIB1, RMSI, FBE configuration, DL eMBB data, DL URLLC data) from the modem subsystem 812 (on outbound transmissions) or of transmissions originating from another source such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., PUCCH, PUSCH, eMBB data, URLLC data) to the FBE module 808 for processing. The antennas 816 may include multiple antennas of similar or different designs in order to sustain multiple transmission links.

In some aspects, the transceiver 810 is configured to communicate with components of the BS 800 to transmit a configuration for a UE (e.g., the UEs 115 and/or 900) to initiate a COT in an FBE mode. The configuration indicates a first FBE frame period (e.g., a period or duration of a UE FFP such as the UE FFPs 320, 420, 520, and/or 620). The transceiver 810 is further configured to communicate with components of the BS 800 to receive, from the UE during a COT associated with the UE, an uplink communication signal. The COT is within a first FBE frame having the first FBE frame period.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
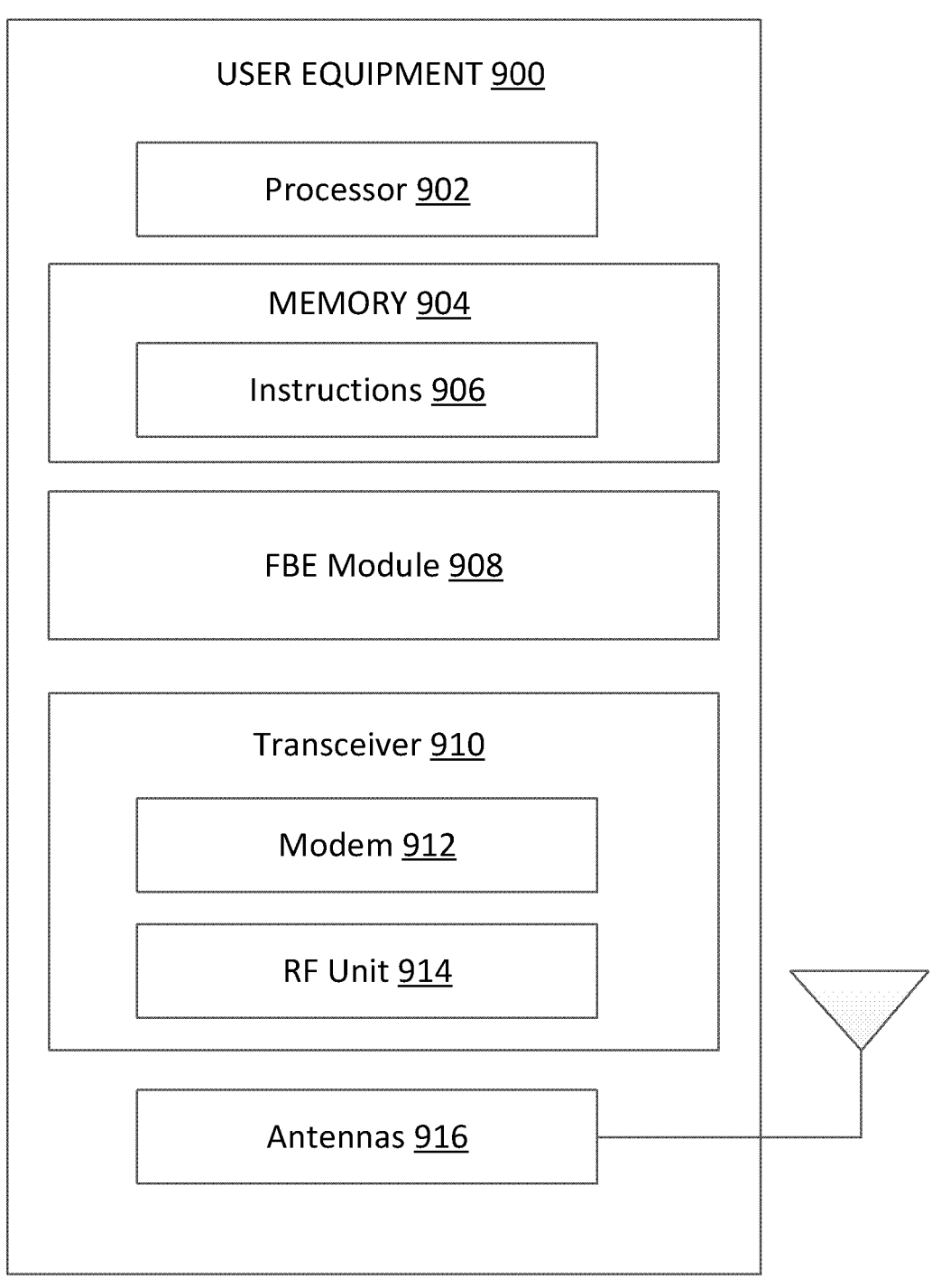
FIG. 9 is a block diagram of an exemplary user equipment (UE) according to some aspects of the present disclosure.

FIG. 9 is a block diagram of an exemplary UE 900 according to some aspects of the present disclosure. The UE 900 may be a UE 115 discussed above in FIG. 1. As shown, the UE 900 may include a processor 902, a memory 904, an FBE module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UEs 115 in connection with aspects of the present disclosure, for example, aspects of FIGS. 1-7 and 10. Instructions 906 may also be referred to as program code. The program code may be for causing a wireless communication device to perform these operations, for example by causing one or more processors (such as processor 902) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The FBE module 908 may be implemented via hardware, software, or combinations thereof. For example, the FBE module 908 may be implemented as a processor, circuit, and/or instructions 906 stored in the memory 904 and executed by the processor 902. In some instances, the FBE module 908 can be integrated within the modem subsystem 912. For example, the FBE module 908 can be implemented by a combination of software components (e.g., executed by a DSP or a general processor) and hardware components (e.g., logic gates and circuitry) within the modem subsystem 912.

The FBE module 908 may communicate with various components of the UE 900 to perform various aspects of the present disclosure, for example, aspects of FIGS. 1-7 and 10. For instance, the FBE module 908 is configured to receive, from a BS, a configuration for the UE to initiate a COT (e.g., the COTs 322, 422, 522, 622, and/or 742) in an FBE mode. The configuration indicates a first FBE frame period (e.g., a period or duration of a UE FFP such as the UE FFPs 320, 420, 520, and/or 602). In some aspects, the first FBE frame period is one of a first set of FBE frame periods associated with the UE. The configuration may be received during a second FBE frame (e.g., the BS FFPs 310) having a second FBE frame period, where the second FBE frame period is one of a second set of FBE frame periods associated with the BS. In some aspects, the first FBE frame period is different than the second FBE frame period. In some aspects, the first set of FBE frame periods and the second set of FBE frame periods include at least one different FBE frame period. In some aspects, the first set of FBE frame periods is the same as the second set of FBE frame periods. In some aspects, the first FBE frame period is an integer multiple of the second FBE frame period, for example, as discussed above in relation to FIG. 3. In some aspects, the first FBE frame period is an integer factor of the second FBE frame period, for example, as discussed in relation to FIG. 4. In some aspects, the configuration is an RRC configuration.

The FBE module 908 is further configured to initiate the COT in a first FBE frame (e.g., the UE FFP 320, 420, 520, and/or or 620) having the first FBE frame period. For instance, the UE performs an LBT during an idle period (e.g., the idle period 314) within a preceding FBE frame. The LBT may be an FBE mode CAT2 LBT as discussed above. For instance, the FBE module 808 may be configured to measure signal energy in the channel over a measurement duration of at least 4 μs within a 9 μs sensing interval immediately before the COT. The FBE module 808 may be configured to receive a signal from the channel and compute a power of the received signal, determine that the channel is available if the measurement satisfies a certain threshold (the COT is successfully acquired), or determine the channel is occupied or busy if the measurement fails to satisfy the threshold.

In some aspects, the FBE module 908 may be configured to initiate the COT further based on a UE-initiated COT recurring period that is longer than the first FBE frame period, for example, as discussed above in relation to FIGS. 5 and/or 6. In some aspects, the UE-initiated COT recurring period is an integer multiple of the first FBE frame period. In some aspects, a boundary of the first FBE frame is aligned to a boundary of the UE-initiated COT recurring period. In some aspects, the configuration may further indicate the UE-initiated COT recurring period. In some aspects, a start of the first FBE frame is offset from a boundary of the UE-initiated COT recurring period. In some aspects, the configuration may further indicate the UE-initiated COT recurring period and the offset. In some aspects, the configuration may include an indication of a first number of the first FBE frame periods in the UE-initiated COT recurring period and an indication of a second number of the first FBE frame periods in the offset.

The FBE module 908 is further configured to transmit, to the BS during the COT, an uplink communication signal. The uplink communication signal may include UL data and/or UCI.

As shown, the transceiver 910 may include the modem subsystem 912 and the RF unit 914. The transceiver 910 can be configured to communicate bi-directionally with other devices, such as the BSs 105. The modem subsystem 912 may be configured to modulate and/or encode the data from the memory 904 and/or the FBE module 908 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 914 may be configured to process (e.g., perform analog to digital conversion or digital to analog conversion, etc.) modulated/encoded data (e.g., PUCCH, PUSCH, eMBB data, URLLC data) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PDCCH, PDSCH, configured grants, dynamic scheduling grants, RRC configuration, SIB1, RMSI, FBE configuration, DL eMBB data, DL URLLC data) to the FBE module 908 for processing. The antennas 916 may include multiple antennas of similar or different designs in order to sustain multiple transmission links. The RF unit 914 may configure the antennas 916.

In some aspects, the transceiver 910 is configured to communicate with components of the UE 900 to receive, from a BS, a configuration for the UE to initiate a COT in an FBE mode, where the configuration indicates a first FBE frame period. The processor 902 is configured to communicate with components of the UE 900 to initiate the COT in a first FBE frame (e.g., the UE FFP 320, 420, 520, and/or or 620) having the first FBE frame period. The transceiver 910 is further configured to communicate with components of the UE 900 to transmit, to the BS during the COT, an uplink communication signal. The uplink communication signal may include UL data and/or UCI.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
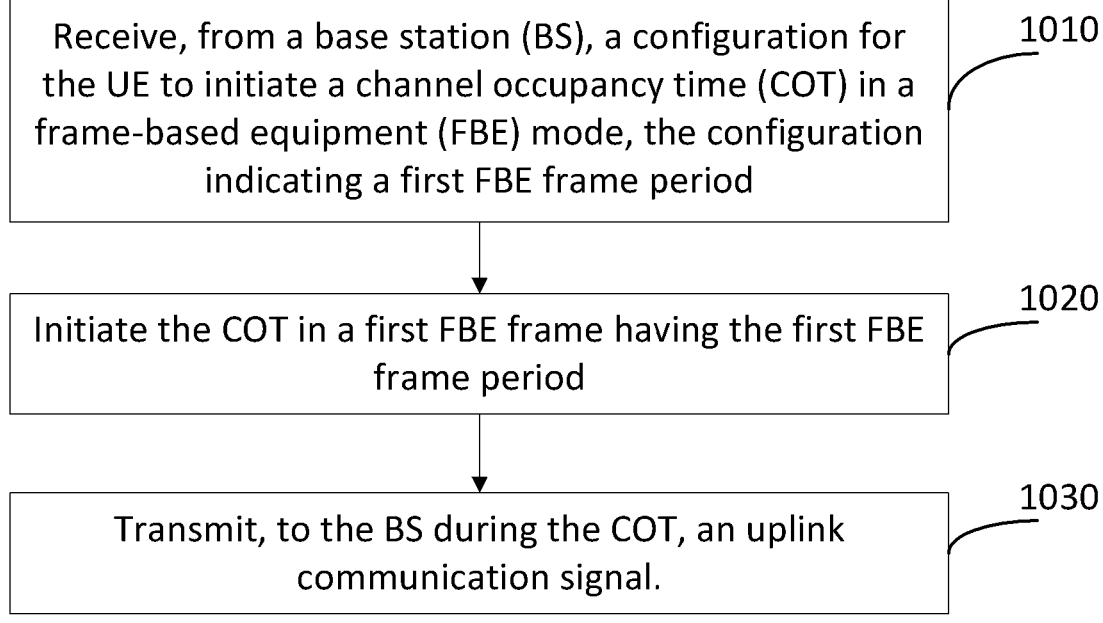
FIG. 10 is a flow diagram of a communication method according to some aspects of the present disclosure.

FIG. 10 is a flow diagram of a communication method 1000 according to some aspects of the present disclosure. Aspects of the method 1000 can be executed by a UE, such as the UEs 115 and/or 900. A UE may comprise a processor, processing circuit, and/or any other suitable component or means for performing the steps. For example, a UE 900 may utilize one or more components, such as the processor 902, the memory 904, the FBE module 908, the transceiver 910, the modem 912, and the one or more antennas 916, to execute the steps of method 1000. The method 1000 may employ similar mechanisms as discussed above with respect to FIGS. 1-7. The method 1000 may be employed as part of a semi-static channel access scheme using FBE mode of operations. For example, the method 1000 may be employed in NR-U in an IIOT scenario. Further, the method 1000 may be used to enable URLLC between a BS and a UE. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a UE (e.g., the UE 115 or 900) receives, from a BS, a configuration for the UE to initiate a COT (e.g., the COTs 322, 422, 522, 622, and/or 742) in an FBE mode. The configuration indicates a first FBE frame period (e.g., a period or duration of a UE FFP such as the UE FFPs 320, 420, 520, and/or 620). In some aspects, the first FBE frame period is one of a first set of FBE frame periods associated with the UE. The configuration may be received during a second FBE frame (e.g., the BS FFPs 310) having a second FBE frame period, where the second FBE frame period is one of a second set of FBE frame periods associated with the BS. In some aspects, the first FBE frame period is different than the second FBE frame period. In some aspects, the first set of FBE frame periods and the second set of FBE frame periods include at least one different FBE frame period. In some aspects, the first set of FBE frame periods is the same as the second set of FBE frame periods. In some aspects, the first FBE frame period is an integer multiple of the second FBE frame period, for example, as discussed above in relation to FIG. 3. In some aspects, the first FBE frame period is an integer factor of the second FBE frame period, for example, as discussed in relation to FIG. 4. In some aspects, the configuration is an RRC configuration. In some aspects, the UE may utilize one or more components, such as the processor 902, the memory 904, the FBE module 908, the transceiver 910, the modem 912, and the one or more antennas 916, to perform operations of block 1010.

At block 1020, the UE initiates the COT in a first FBE frame (e.g., the UE FFP 320, 420, 520, and/or or 620) having the first FBE frame period. For instance, the UE performs an LBT during an idle period (e.g., the idle period 314) within a preceding FBE frame. The LBT may be an FBE mode CAT2 LBT as discussed above. For instance, the UE may measure signal energy in the channel over a measurement duration of at least 4 μs within a 9 μs sensing interval immediately before the COT. The UE may receive a signal from the channel and compute a power of the received signal. If the measurement is below a certain threshold, the channel is available or idle and the UE may successfully acquire the COT. Otherwise, the channel is occupied or busy. In some aspects, the UE may utilize one or more components, such as the processor 902, the memory 904, the FBE module 908, the transceiver 910, the modem 912, and the one or more antennas 916, to perform the operations of block 1020.

At block 1030, the UE transmits, to the BS during the COT, an uplink communication signal. The uplink communication signal may include UL data and/or UCI. In some aspects, the UE may utilize one or more components, such as the processor 902, the memory 904, the FBE module 908, the transceiver 910, the modem 912, and the one or more antennas 916, to perform the operations of block 1030.

In some aspects, the UE may initiate the COT at block 1020 further based on a UE-initiated COT recurring period that is longer than the first FBE frame period, for example, as discussed above in relation to FIGS. 5 and/or 6. In some aspects, the UE-initiated COT recurring period is an integer multiple of the first FBE frame period. In some aspects, a boundary of the first FBE frame is aligned to a boundary of the UE-initiated COT recurring period. In some aspects, the configuration received at block 1010 may further indicate the UE-initiated COT recurring period. In some aspects, a start of the first FBE frame is offset from a boundary of the UE-initiated COT recurring period. In some aspects, the configuration received at block 1010 may further indicate the UE-initiated COT recurring period and the offset. In some aspects, the configuration received at block 1010 may include an indication of a first number of the first FBE frame periods in the UE-initiated COT recurring period and an indication of a second number of the first FBE frame periods in the offset.

In some aspects, the UE may further receive, from the BS during the COT based on COT sharing, a downlink communication signal. For instance, the UE may transmit the uplink communication signal at block 1030 during a portion of the COT, and the BS may transmit the downlink communication signal during a remaining portion of the COT.

FIG. 11 is a flow diagram of a communication method 1100 according to some aspects of the present disclosure. Aspects of the method 1100 can be executed by a BS, such as the BSs 105 and/or 800. A BS may comprise a processor, processing circuit, and/or any other suitable component or means for performing the steps. For example, a BS 800 may utilize one or more components, such as the processor 802, the memory 804, the FBE module 808, the transceiver 810, the modem 812, and the one or more antennas 816, to execute the steps of method 1100. The method 1100 may employ similar mechanisms as discussed above with respect to FIGS. 1-7. The method 1100 may be employed as part of a semi-static channel access scheme using frame-based equipment (FBE). For example, the method 1100 may be employed in NR-U in an IIOT scenario. Further, the method 1100 may be used to enable URLLC between a BS and a UE. As illustrated, the method 1100 includes a number of enumerated steps, but aspects of the method 1000 may include additional steps before, after, and in between the enumerated steps. In some aspects, one or more of the enumerated steps may be omitted or performed in a different order.

At block 1110, a BS (e.g., the BSs 105 and/or 800) transmits, to a UE, a configuration for the UE (e.g., the UEs 115 and/or 900) to initiate a COT (e.g., the COTs 322, 422, 522, 622, and/or 742) in an FBE mode. The configuration indicates a first FBE frame period (e.g., a period or duration of a UE FFP such as the UE FFPs 320, 420, 520, and/or 620). In some aspects, the first FBE frame period is one of a first set of FBE frame periods associated with the UE. The configuration may be transmitted during a second FBE frame (e.g., the BS FFPs 310) having a second FBE frame period, where the second FBE frame period is one of a second set of FBE frame periods associated with the BS. In some aspects, the first FBE frame period is different than the second FBE frame period. In some aspects, the first set of FBE frame periods and the second set of FBE frame periods include at least one different FBE frame period. In some aspects, the first set of FBE frame periods is the same as the second set of FBE frame periods. In some aspects, the first FBE frame period is an integer multiple of the second FBE frame period, for example, as discussed above in relation to FIG. 3. In some aspects, the first FBE frame period is an integer factor of the second FBE frame period, for example, as discussed in relation to FIG. 4. In some aspects, the configuration is an RRC configuration. In some aspects, the BS may utilize one or more components, such as the processor 802, the memory 804, the FBE module 808, the transceiver 810, the modem 812, and the one or more antennas 816, to perform the operations of block 1110.

At block 1120, the BS receives, from the UE during a COT associated with the UE, an uplink communication signal. The COT is within a first FBE frame having the first FBE frame period. For instance, the COT is initiated or acquired by the UE according to the configuration. A BS 800 may utilize one or more components, such as the processor 802, the memory 804, the FBE module 808, the transceiver 810, the modem 812, and the one or more antennas 816, to perform the operations of 1120.

In some aspects, the COT is based on a UE-initiated COT recurring period that is longer than the first FBE frame period, for example, as discussed above in relation to FIGS. 5 and/or 6. In some aspects, the UE-initiated COT recurring period is an integer multiple of the first FBE frame period. In some aspects, a boundary of the first FBE frame is aligned to a boundary of the UE-initiated COT recurring period. In some aspects, the configuration transmitted at block 1110 may further indicate the UE-initiated COT recurring period. In some aspects, a start of the first FBE frame is offset from a boundary of the UE-initiated COT recurring period. In some aspects, the configuration transmitted at block 1110 may further indicate the UE-initiated COT recurring period and the offset. In some aspects, the configuration transmitted at block 1110 may include an indication of a first number of the first FBE frame periods in the UE-initiated COT recurring period and an indication of a second number of the first FBE frame periods in the offset.

In some aspects, the BS may further transmit, to the UE during the COT associated with the UE based on COT sharing, a downlink communication signal. For instance, the BS may receive the uplink communication signal at block 1030 during a portion of the COT and transmit the downlink communication signal during a remaining portion of the COT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving, from a base station (BS), a configuration for the UE to initiate a channel occupancy time (COT) in a frame-based equipment (FBE) mode, the configuration indicating a first FBE frame period that is offset from a boundary of a second FBE frame period of the BS;

initiating, based at least in part on a UE-initiated COT recurring period that is longer than the first FBE frame period, the COT in a first FBE frame having the first FBE frame period; and transmitting, to the BS during the COT, an uplink communication signal.

2. The method of claim 1, wherein:

the first FBE frame period is one of a first set of FBE frame periods associated with the UE; and the receiving comprises:

receiving, from the BS, the configuration during a second FBE frame having a second FBE frame period, the second FBE frame period being one of a second set of FBE frame periods associated with the BS.

3. The method of claim 2, wherein the first FBE frame period is different than the second FBE frame period.

4. The method of claim 2, wherein the first set of FBE frame periods and the second set of FBE frame periods include at least one different FBE frame period.

5. The method of claim 2, wherein the first set of FBE frame periods is the same as the second set of FBE frame periods.

6. The method of claim 2, wherein the first FBE frame period is an integer multiple of the second FBE frame period.

7. The method of claim 2, wherein the first FBE frame period is an integer factor of the second FBE frame period.

8. The method of claim 1, wherein the receiving comprises:

receiving, from the BS, a radio resource control (RRC) configuration including the configuration.

9. The method of claim 1, further comprising:

receiving, from the BS during the COT based on COT sharing, a downlink communication signal.

10. A method of wireless communication performed by a base station (BS), the method comprising:

transmitting, to a user equipment (UE), a configuration for the UE to initiate a channel occupancy time (COT) in a frame-based equipment (FBE) mode, the configuration indicating a first FBE frame period that is offset from a boundary of a FBE frame period of the BS, wherein the COT is based on a UE-initiated COT recurring period that is longer than the first FBE frame period; and receiving, from the UE during a channel occupancy time (COT) associated with the UE, an uplink communication signal, the COT being within a first FBE frame having the first FBE frame period.

11. The method of claim 10, wherein:

the first FBE frame period is one of a first set of FBE frame periods associated with the UE; and the transmitting comprises:

transmitting, to the UE, the configuration during a second FBE frame having a second FBE frame period, the second FBE frame period being one of a second set of FBE frame periods associated with the BS.

12. The method of claim 11, wherein the first FBE frame period is different than the second FBE frame period.

13. The method of claim 11, wherein the first set of FBE frame periods and the second set of FBE frame periods include at least one different FBE frame period.

14. The method of claim 11, wherein the first set of FBE frame periods is the same as the second set of FBE frame periods.

15. The method of claim 11, wherein the first FBE frame period is an integer multiple of the second FBE frame period.

16. The method of claim 11, wherein the first FBE frame period is an integer factor of the second FBE frame period.

17. The method of claim 10, wherein the transmitting comprises:

transmitting, to the UE, a radio resource control (RRC) configuration including the configuration.

18. The method of claim 10, further comprising:

transmitting, to the UE during the COT associated with the UE based on COT sharing, a downlink communication signal.

19. A user equipment (UE) comprising:

a transceiver configured to:

receive, from a base station (BS), a configuration for the UE to initiate a channel occupancy time (COT) in a frame-based equipment (FBE) mode, the configuration indicating a first FBE frame period that is offset from a boundary of a second FBE frame period of the BS; and transmit, to the BS during the COT, an uplink communication signal; and a processor configured to initiate, based at least in part on a UE-initiated COT recurring period that is longer than the first FBE frame period, the COT in a first FBE frame having the first FBE frame period.

20. The UE of claim 19, wherein:

the first FBE frame period is one of a first set of FBE frame periods associated with the UE; and the transceiver configured to receive the configuration is configured to:

receive, from the BS, the configuration during a second FBE frame having a second FBE frame period, the second FBE frame period being one of a second set of FBE frame periods associated with the BS.

21. The UE of claim 19, wherein the transceiver configured to receive the configuration is configured to:

receive, from the BS, a radio resource control (RRC) configuration including the configuration.

22. The UE of claim 19, wherein the transceiver is further configured to:

receive, from the BS during the COT based on COT sharing, a downlink communication signal.

23. A user equipment (UE) comprising:

means for receiving, from a base station (BS), a configuration for the UE to initiate a channel occupancy time (COT) in a frame-based equipment (FBE) mode, the configuration indicating a first FBE frame period that is offset from a boundary of a second FBE frame period of the BS;

means for initiating, based at least in part on a UE-initiated COT recurring period that is longer than the first FBE frame period, the COT in a first FBE frame having the first FBE frame period; and means for transmitting, to the BS during the COT, an uplink communication signal.

24. The UE of claim 23, wherein:

the first FBE frame period is one of a first set of FBE frame periods associated with the UE; and the means for receiving the configuration is configured to:

receive, from the BS, the configuration during a second FBE frame having a second FBE frame period, the second FBE frame period being one of a second set of FBE frame periods associated with the BS.

25. The UE of claim 23, wherein the means for receiving the configuration is configured to:

receive, from the BS, a radio resource control (RRC) configuration including the configuration.

26. The UE of claim 23, further comprising:

means for receiving, from the BS during the COT based on COT sharing, a downlink communication signal.

27. A base station (BS) comprising:

means for transmitting, to a user equipment (UE), a configuration for the UE to initiate a channel occupancy time (COT) in a frame-based equipment (FBE) mode, the configuration indicating a first FBE frame period that is offset from a boundary of a FBE frame period of the BS, wherein the COT is based on a UE-initiated COT recurring period that is longer than the first FBE frame period; and means for receiving, from the UE during a channel occupancy time (COT) associated with the UE, an uplink communication signal, the COT being within a first FBE frame having the first FBE frame period.

28. The BS of claim 27, wherein:

the first FBE frame period is one of a first set of FBE frame periods associated with the UE; and the means for transmitting the configuration is configured to:

transmit, to the UE, the configuration during a second FBE frame having a second FBE frame period, the second FBE frame period being one of a second set of FBE frame periods associated with the BS.

29. The BS of claim 28, wherein the first FBE frame period is different than the second FBE frame period.

30. The BS of claim 27, wherein the means for transmitting the configuration is configured to:

transmit, to the UE, a radio resource control (RRC) configuration including the configuration.

31. The BS of claim 27, further comprising:

means for transmitting, to the UE during the COT associated with the UE based on COT sharing, a downlink communication signal.

32. The UE of claim 20, wherein the first FBE frame period is different than the second FBE frame period.

33. The UE of claim 20, wherein the first set of FBE frame periods and the second set of FBE frame periods include at least one different FBE frame period.

34. The UE of claim 20, wherein the first set of FBE frame periods is the same as the second set of FBE frame periods.

35. The UE of claim 20, wherein the first FBE frame period is an integer multiple or an integer factor of the second FBE frame period.

* * * * *